United States Patent
Braunstein

(10) Patent No.: US 9,847,628 B2
(45) Date of Patent: Dec. 19, 2017

(54) PLUG AND POWER DISTRIBUTION AND CONTROL APPARATUS

(71) Applicant: Zachary Leonid Braunstein, San Marcos, CA (US)

(72) Inventor: Zachary Leonid Braunstein, San Marcos, CA (US)

( * ) Notice: Subject to any disclaimer, the term of this patent is extended or adjusted under 35 U.S.C. 154(b) by 526 days.

(21) Appl. No.: 13/731,103

(22) Filed: Dec. 30, 2012

(65) Prior Publication Data

US 2014/0183977 A1    Jul. 3, 2014

(51) Int. Cl.
*H02G 3/00*  (2006.01)

(52) U.S. Cl.
CPC .................. *H02G 3/00* (2013.01)

(58) Field of Classification Search
CPC ......................................... H02G 3/00
USPC ............................................. 307/31
See application file for complete search history.

(56) References Cited

U.S. PATENT DOCUMENTS

| | | | | |
|---|---|---|---|---|
| 4,414,994 A * | 11/1983 | Hogan | ............ | F16K 17/36 137/38 |
| 6,212,088 B1 * | 4/2001 | Yoo | ............ | H02J 1/00 363/146 |
| 8,341,837 B2 * | 1/2013 | Braunstein | ............ | H01R 25/006 29/593 |
| 2003/0222503 A1 * | 12/2003 | Lam | ............ | G06F 1/266 307/38 |
| 2006/0024996 A1 * | 2/2006 | Johnson | ............ | H02G 3/00 439/215 |
| 2009/0052122 A1 * | 2/2009 | Johnson | ............ | H01R 25/16 361/643 |
| 2010/0237695 A1 * | 9/2010 | Covaro | ............ | H02J 13/0003 307/19 |
| 2011/0131230 A1 * | 6/2011 | Nyman | ............ | G06Q 10/06 707/769 |
| 2012/0292991 A1 * | 11/2012 | Dodal | ............ | H02H 3/16 307/11 |
| 2013/0271884 A1 * | 10/2013 | Wagner | ............ | H02H 3/305 361/65 |

\* cited by examiner

*Primary Examiner* — Robert Deberadinis

(57) ABSTRACT

Invention describes apparatus of configurable electrical circuits controlling and distributing electrical DC power adaptable to ambient environment and specification of a device connected to the apparatus. The apparatus executing a control algorithm within an acceptance criteria for adaptable plug-and-power distribution and communications for: residential, commercial, industrial applications, electro-mechanical devices and computer systems. Invention transforms existing labor-intense installations into plug-and-power modular systems. For a specific project, pre-designed, pre-fabricated kits of factory assembled and tested power control modules and interface cables, are delivered directly to installation site. Invention improves safety, reliability, and efficiency of power distribution, significantly lowers installation time and expenses.

12 Claims, 13 Drawing Sheets

Figure 1:
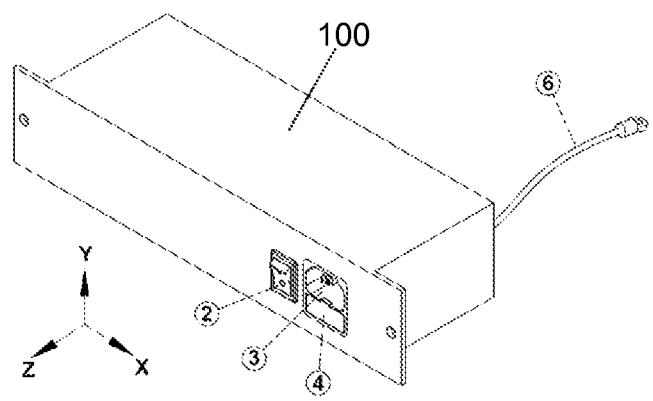

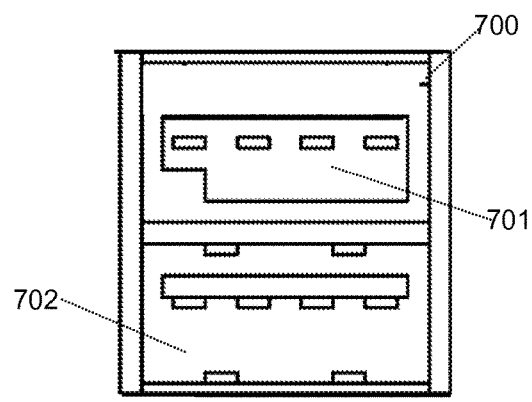
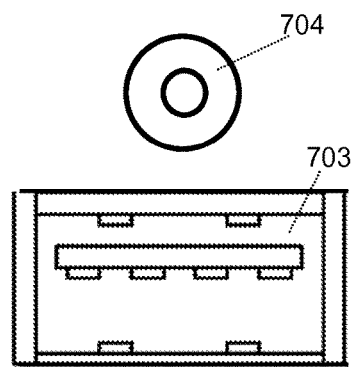
FIG. 27    FIG. 28
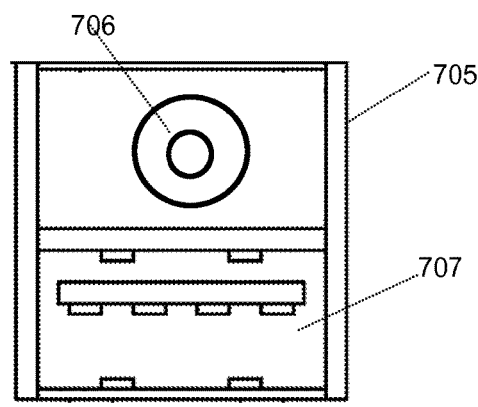
FIG. 29

PLUG AND POWER DISTRIBUTION AND CONTROL APPARATUS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

A majority of AC electrical wiring of residential, commercial and industrial structures, as one of important steps in providing completed structure with required power, has fallen drastically behind the progress attained in other areas of construction, such as: wiring for communications, including phone lines, LAN, internet, etc. Based on existing methods of wiring AC electrical power, the installation time, installation quality, reliability, repeatability and end-result including safety of installations—depends heavily on hi-skill manual labor. As result, overall quality of each practical installation is at a mercy of an installation crew, which must maintain required: workmanship skills; detailed attention to specifications, including wiring diagrams, which are more complex these days due to demands for larger and sophisticated structures; installation quality at a rather intensive schedule of completion; etc. In addition to problems stated above, the associated costs of electrical power wiring of a structure—is constantly going up, not so much due to better quality of materials, but rather due to increases in labor costs.

While the costs of building materials in general went up significantly, and while the buildings themselves have appreciated substantially, the existing electrical components and technology used for wiring electrical power has remained disproportionably behind. The existing technology is utilizing primarily individual wires, not cables, and as result, it is very challenging to reduce electromagnetic interferences produced by power devices and propagated along these wires, which will: present health risks to individuals situated in a close proximity; and impact operating environment for other devices.

A majority of electrical and electro-mechanical equipment, including: machinery, stand-alone devices, computers—require adequate means for connecting to required electrical power, and then providing power distribution within them. For simplicity, the applicable equipment in this application will be referred as device.

There are a number of applications, where electrical power to devices is provided via interface modules, including ones that resemble a standard power strip. There is a range of equipment, such as ATM machines, Vending machines, and Process machines in general, etc., that will be considered a main device, which will incorporate other secondary devices within them, such as: display monitor, printer, etc., which also require electrical power applied to them.

The existing power distribution methods, although being adequate in electrical power ratings, are not conveniently packaged to provide cost-efficient solutions. As a result, designers of power distribution systems (AC and DC) have little choice, but to employ a number of off-the-shelf individual components, and then provide power distribution between them via discrete cables, wires, leaving a number of exposed hi-power leads, terminals, etc. presenting a safety hazard.

The method of utilization of stand-alone devices (TV, TV cable boxes, Stereo equipment, etc.), which currently have their own AC-DC power converter, is inefficient. Every AC-DC power converter or power supply has a power converting efficiency of around 90%, i.e. 10% wasted. In an average household the wasted power from all power converters installed can exceeds 100 W during operation of the devices, and ~20 W during their idle mode. That is a lot of KWH wasted every day at an average household alone, which amounts to Mega Watts for a region, and enormous for our country.

In summary, the existing power distribution methods do not provide a cost efficient, most reliable and safe solution.

BRIEF SUMMARY OF THE INVENTION

The invention describes "Plug and Power Distribution and Control Apparatus", and the Method of using the Apparatus, which provides a comprehensive component and system level solutions to current and future requirements in regard to:

1) Electrical AC power distribution of structures, which will include: residential, commercial, and industrial, and AC power distribution for AC powered devices.
2) Electrical AC and DC power distribution of structures, which will include: residential, commercial, and industrial, and AC and DC power distribution for AC and DC powered devices.
3) Electrical DC power distribution of structures, which will include: residential, commercial, and industrial, and DC power distribution for DC powered devices.

For power distribution designs for industrial, commercial and residential applications—the invention represents a giant step forward vs. existing technologies, including:

a) Superior level of quality and safety.
   Only standard, agency approved, pre-assembled, tested, and inspected plug and power Modules and interfaces will be used. All components and Modules will be assembled at the factory with required level of automation to ensure repeatable process and product quality for every installation regardless of size, complexity, location or time schedule. All components and Modules will be agency pre-approved. All pre-assembled Modules will be tested to the highest safety levels, including hi-pot, etc. The proposed technology described by the invention will utilize plug and power distribution and control components. As required, a section of a system or the entire system, consisting of plug and power modules, devices and components, can be interfaced via shielded plug and power interfaces protecting the environment from power related electro-magnetic interferences, and result, improving operating environment for other devices, as well as reduce safety health hazard on individuals.

b) Exceptional efficiency and effectiveness.
   For each new or existing project, regardless of complexity of a custom designed building or a track house development, a pre-manufactured kit, which will include—all essential plug and power distribution, interface and control components—will be prepared, tested, inspected and delivered to the construction site. The installation, approaching industry term of "plug-n-play", with simple point-to-point plug and power connections, will significantly lower the time to complete the wiring of a structure, with no compromise in quality or safety. In addition, the overall layout and workmanship for any track development, would be highly consistent, which is important for future expansion, modifications, etc. Described by the invention the DC plug and power distribution and control apparatus will allow to reduce the number of AC-DC converters, replacing them with fewer more efficient AC-DC power converters supplying DC power via plug and power interfaces to a variety of DC rated devices, replacing stand-alone PSU. The invention will allow utilization of power efficient lighting, such as LED, powered directly from a DC power outlets, replacing existing inefficient AC powered light devices. For added efficiency, the DC plug and power distribution interfaces (cables, etc.) will be designed by utilization of high-efficiency conductive materials to minimize power losses within distribution lines.

The invention will advance the electrical power wiring of structures to a required level, so that support of new construction, as well as re-build of structures previously damaged or non-compliant, will be accomplished in a most effective and efficient way.

The invention of Plug and Power Distribution and Control Apparatus, and the Method of using the Apparatus will provide a number of very important benefits to the power distribution industry and its users, including:

1) Lower installation costs due to significant reduction in labor skills and time required
2) Lower operation costs due to significant improvements in energy utilization efficiency
3) Lower maintenance costs due to improved component reliability and significant reduction in labor skills and time required to replace or upgrade a plug and power component
4) Improved safety by employing plug and power interfaces eliminating any hot wires from being accessible by bare hands, including service personnel
5) Opportunity of combing DC plug and power distribution with plug and power communications

BRIEF DESCRIPTION

Drawing Content and Listing

The application contains drawings listed in Table 1, below.

TABLE 1

List of Drawings.

| FIG. | Description |
|---|---|
| 1 | 3-D view of a DC power distribution plug-and-power strip configured with: AC-DC power converter inside enclosure of the strip; AC male input plug on side #1; AC power ON/OFF switch on side #1; and DC power distribution female plugs on side #2, which is opposite to side #1. |

TABLE 1-continued

List of Drawings.

| FIG. | Description |
|---|---|
| 2 | X-Y view of side #1 of the DC power distribution plug-and-power strip, shown on FIG. 1 |
| 3 | X-Y view of side #2 of the DC power distribution plug-and-power strip, shown on FIG. 1 |
| 4 | 3-D view of a DC power plug-and-power outlet configured with: AC male connector providing AC power; AC-DC converter inside enclosure; DC dual power female plug-and-power outlets. |
| 5 | 3-D view of a DC power plug-and-power outlet configured with: DC male connector providing DC power; DC dual power female plug-and-power outlets. |
| 6 | Front view of an AC/DC power plug-and-power outlet configured with: AC male connector providing AC power; AC-DC converter inside enclosure; AC power female plug-and-power outlet; DC power female plug-and-power outlet. |
| 7 | Front view of a dual DC power plug-and-power outlet configured with: AC male connector providing AC power; AC-DC converter inside enclosure; one DC power female plug-and-power outlet providing voltage V1; and second DC power female plug-and-power outlet providing voltage V2. |
| 8 | Front view of a dual DC power plug-and-power outlet configured with: DC male connector providing DC power; two DC power female plug-and-power outlets providing voltage V1. |
| 9 | Front view of a dual AC/DC switch module configured with an AC section of: AC male connector providing AC power; AC ON/OFF switch; AC female connector providing AC power controlled by the AC switch; and further configured with a DC section of: DC male connector providing DC power; DC ON/OFF switch; DC female connector providing DC power controlled by the DC switch. |
| 10 | Front view of a DC plug-and-power outlet configured with: DC male connector providing DC power; three DC power female plug-and-power outlets providing voltage V1. |
| 11 | Front view of a DC switch module configured with: DC male connector providing DC power; DC ON/OFF switch; DC female connector providing DC power controlled by the DC switch. |
| 12 | Conceptual layout of a AC-DC power source with only pluggable interfaces for incoming and outgoing powers, which is configured with: AC male connector providing AC power; AC power ON/OFF switch; section #1 providing three plug-and-power DC female outlets for voltage V1; section #2 providing three plug-and-power DC female outlets for voltage V2; section #3 providing three plug-and-power DC female outlets for voltage V3; |
| 13 | DC plug-and-power distribution strip configured with: DC male connector for providing input DC power; DC input power ON/OFF switch; four plug-and-power DC female connectors providing voltage V1. |
| 14 | 3-D view of a DC power switch module configured with: DC male connector for providing input DC power from the top of the module; DC power ON/OFF switch located on the front of the module; DC female connector for providing controlled DC output power, which is located on the top of the module next to input connector. |
| 15 | 3-D view of a DC power plug-and-power outlet configured with: AC male connector providing AC power; AC-DC converter inside enclosure; two DC power female plug-and-power outlets providing voltage V1; two DC power female plug-and-power outlets providing voltage V2. |
| 16 | Conceptual layout of a AC-DC intelligent power source with only pluggable interfaces for incoming and outgoing powers, which is configured with: AC male connector providing AC power; AC power ON/OFF switch; controller with user interface and PC Host interface, located inside enclosure; AC-DC converter located inside enclosure; section #1 providing three plug-and-power DC female outlets |

TABLE 1-continued

List of Drawings.

| FIG. | Description |
|---|---|
| | for voltage V1, with self-diagnostics status LED's; section #2 providing three plug-and-power DC female outlets for voltage V2, with self-diagnostics status LED's; section #3 providing three plug-and-power DC female outlets for voltage V3, with self-diagnostics status LED's; |
| 17 | Front view of an intelligent AC/DC power plug-and-power outlet configured with: AC male connector providing AC power; AC-DC converter inside enclosure; controller inside enclosure; AC power female plug-and-power outlet with self-diagnostics status LED; DC power female plug-and-power outlet with self-diagnostics status LED. |
| 18 | Front view of an intelligent dual DC power plug-and-power outlet configured with: AC male connector providing AC power; AC-DC converter inside enclosure; controller inside enclosure; one DC power female plug-and-power outlet providing voltage V1 with self-diagnostics status LED; and second DC power female plug-and-power outlet providing voltage V2 with self-diagnostics status LED. |
| 19 | Front view of an intelligent dual DC power plug-and-power outlet configured with: DC male connector providing DC input power; controller inside enclosure; one DC power female plug-and-power outlet providing voltage V1 with self-diagnostics status LED; and second DC power female plug-and-power outlet providing voltage V1 with self-diagnostics status LED. |
| 20 | Intelligent DC plug-and-power distribution strip configured with: DC male connector for providing input DC power; DC input power ON/OFF switch; controller inside enclosure; four plug-and-power DC female connectors providing voltage V1 with self-diagnostics status LED. |
| 21 | Side #1 of an intelligent DC power distribution plug-and-power strip configured with: AC-DC power converter inside enclosure of the strip; controller inside enclosure, with user interface; AC male input plug; AC power ON/OFF switch. |
| 22 | Side #2 opposite to side #1 of an intelligent DC power distribution plug-and-power strip (FIG. 21) configured with: two female plug-and-power DC outlets providing voltage V1 with self-diagnostics status LED's;: four female plug-and-power DC outlets providing voltage V2 with self-diagnostics status LED's. |
| 23 | Example #1 of plug and power DC interface cable. |
| 24 | Example #2 of plug and power DC interface cable. |
| 25 | Example of plug and power AC interface cable. |
| 26 | Example of a method of configuring and controlling an intelligent modular DC plug and power distribution and control. |
| 27 | Existing 12 V power USB interface. |
| 28 | Example #1 of plug and power 12 V power distribution separate from USB interface. |
| 29 | Example #2 of a connector consisting of plug and power 12 V power distribution and USB interface. |
| 30 | Example #3 of a single PC-board with plug and power 12 V power distribution and USB interfaces available for each 12 V plug and power outlet. |
| 31 | PC-board with two USB connectors two plug and power 12 V outlets |
| 32 | Plug and power interface which is configured to combine DC power distribution with communications, modulated over DC power line. |
| 33 | Plug and power outlet module which is configured to provide one DC plug and power outlet with diagnostics, and one plug and power communication outlet with diagnostics. |

DRAWING CONVENTION AND FORMAT

Drawings with this application, in addition to USPTO requirements, are:

a) Not to scale.
b) Referenced to "X-Y-Z" coordinate system, which is consistent throughout all Drawings.

Definitions

The invention lists definitions of specific components, Modules, or processes, some of which are scripted in "bold italic", and listed below in alphabetical order.

Notes:
1. All materials, components, Modules, processes, etc. defined and/or described by the invention are in compliance with respective agency, including national and/or local code, in regard to safety, and other respective regulations.
2. While for simplicity majority of illustrations are based on AC power distribution of 115 VAC, the invention is applicable for AC power distribution of 230 VAC, and other voltage systems, as needed.
3. While for simplicity majority of illustrations are based on DC power distribution of low DC voltage from 5V to 12 VDC, the invention is applicable for DC power distribution of other DC voltages, including: 24V, 48V, and other voltage systems, as needed.
4. All materials, components, Modules, etc. of the invention will be used according to their manufacturer's approved specifications, including: power rating, environment, etc.
5. All components, including cables, Modules, etc. will be designed to reduce electromagnetic interferences (EMI) produced by power devices, and will: reduce health risks to individuals nearby; improve operating environment for other devices.
6. Modules will be designed with their respective power connections located such as to accommodate the most cost efficient wiring during installation and/or convenient connection of devices by users.
7. For safety reasons, each Module will be designed to be housed inside an enclosure, with input power plug or plugs and output power receptacle or receptacles exposed outside enclosure. Module's mounting hardware and Earth ground wire will be the only components exposed, as needed. As needed, enclosures will be made out of metal, which together with proper use of shielded cables and proper Earth grounding—will ensure the environment surrounding each Module, component or cable, will be free of EMI and static charge.
8. Each Module and component, as required by local or national safety code, will have a designated Earth ground wire connected to its enclosure, and which will be used for connecting to Earth ground during installation.
9. All Modules and components will have required label, which will represent: power rating; functional application; operating environment; etc. Label information will be designed as required to meet respective safety agency regulations.
10. Illustrated orientation of components, number and/or location of power inlets and outlets, etc. serves to demonstrate the principals of the invention, and will be changed, as needed, for any specific application.
11. For DC plug and power distribution and control a number of pluggable connectors will be used, including: standard DC jacks and DC plugs. The differentiation between the DC voltages will be accomplished by utilization of pluggable connectors of different sizes for each voltage, with proper current ratings in support of required power conduction.

Examples:

DC plugs and jacks with ID of ~1.3 mm can be used for plug-and-power distribution of 5V;

DC plugs and jacks with ID of ~2 mm can be used for plug-and-power distribution of 12V;

DC plugs and jacks with ID of ~2.5 mm can be used for plug-and-power distribution of 24V;

12. For simplicity a limited variety of power interface connectors are shown. The invention will allow utilization of a wide variety of power connectors approved by respective safety agency, including: twist-lock type, and others, for a more reliable lockable interfaces.

13. The apparatus can be configured to combine the DC plug and power distribution with plug and power communications, including: serial USB, Internet. The communication interfaces can share the same conductors as the ones carrying the DC power. The multiplexing of communication signals over the DC plug and power lines will be accomplished by the system controller, while decoding of the communication signals from the DC plug and power distribution lines will be accomplished by respective controller at the power and communication distribution modules.

DETAILED DESCRIPTION OF THE INVENTION

Notes:

1) For simplicity, the examples of Systems, Devices, Modules and components within them, presented in document "Drawings", are for illustration purposes of respective principals of the invention. The actual design of components, layout and arrangement of the plug and power distribution and control apparatus, will be configured to meet requirements of a specific application. The invention describes unique apparatus in respect to new principals of:
   a) AC plug and power distribution and control
   b) AC-DC plug and power distribution and control
   c) DC plug and power distribution and control
   d) Plug and power distribution and control of DC power and communications
   within structures (buildings), machines, devices.

2) The plug and power distribution components of the plug and power distribution and control apparatus illustrated by the invention, will comply to agency regulations (safety, immunity, emissions). As result, depending on agency regulations, interfaces for power distribution and controls will utilize female plug and power connectors for the power carrying ends, and male plug and power connectors for power receiving ends.

Example: plug and power distribution of 115 VAC, where strictly female plug and power connectors will be used for power carrying ends, and male plug and power connectors will be used for power receiving ends.

For power levels considered safe, either male or female plug and power connectors will be used for power carrying ends and power receiving ends.

Example: plug and power distribution of 12 VDC, where any combination of female and or male plug and power connectors will be used for power carrying ends, and any combination of female and or male plug and power connectors will be used for power receiving ends.

In all cases, the invention is configured as plug and power, meaning when connections are installed, the system will not have any bare power carrying conductors (wire leads, sections of a connector) exposed, which will prevent hazard of power shock to humans and animals. In addition the plug and power connections can be configured with strain reliefs, weather-proof, to further improve reliability during earthquakes, flooding. In addition, utilization of DC plug and power distribution will significantly reduce risks of a fire hazard during earthquakes.

3) For simplicity, optional features of the plug and power distribution and control apparatus described, and the method of using the apparatus, such as: component shielding, grounding, strain-relief, environmental seals, etc. are not shown on all drawings.

4) In order to achieve required level of efficiency, the plug and power distribution and control apparatus, in particular in respect to DC power, will be configured to include high conductivity power cables, and their current carrying capacity will be selected to minimize loses. Number of daisy-chained plug and power outlets will be controlled to achieve specified system criteria. Since the plug and power distribution and control apparatus will bring significant improvements in safety and installations costs, there will be some additional costs considered to achieve reliable and efficient power distribution, resulting in the overall system cost savings without compromising on efficiency. Example: The number of daisy-chained plug and power DC outlets will be limited to allow simultaneous utilization of all at the average rated power capacity. In addition, the controller of an intelligent plug and power distribution and control apparatus will provide self-diagnostics to inform the end-user of the efficiency factors.

5) The invention illustrates utilization of controller, which though sensors will monitor and control power parameters of the system at specified locations, such as plug and power outlets. Controller via self-diagnostics (such as status LED's) illustrated by the invention, will indicate the status of each outlet. The system configuration can include plug and power distribution with real-time self-diagnostics and controls to achieve a specified level of acceptance criteria, including efficiency.

Example 1: When the usage at any location exceed the limit, the self-diagnostics will indicate the condition, and if the usage is higher by certain amount, will turn OFF the outlet.

Example 2: When the usage at any location exceed the limit, the self-diagnostics will indicate the condition, and as result—self diagnostics on other daisy-chained plug and power outlets will indicate their unavailability (status of being OFF). In this case, a specific outlet from a number of daisy-chained outlets, can be used at a power consumption level above average.

6) External DC power sources illustrated by the invention, and which are used to power the components and modules of the plug and power system, will include: solar energy; batteries; stand-by power generators; etc. All power sources will comply to agency regulations.

7) Plug and power AC-DC converter modules illustrated by the invention will be configured to safely withstand abnormal conditions, including: over limit power usage; over limit environment changes (earth quake, elevated temperatures, vibrations, etc.). The system controller is configured to detect these conditions in real-time, and execute safety control algorithm, including: turning power OFF at selected plug and power distribution outlets, or bringing the entire system to a stand-by mode. The safety control algorithm can include auto-recovery after abnormal condition is no longer present.

8) The controller of the plug and power distribution and control apparatus will retain in its non-volatile memory the system configuration parameters, including: pre-set power limits, environment parameter limits, control algorithm, acceptance criteria.

9) The controller of the plug and power distribution and control apparatus will in real-time execute configuration and controls communicated by a remote Host controller.

10) The controller of the plug and power distribution and control apparatus will in real-time execute configuration and controls communicated by an operator via user interface.

FIG. 1—illustrates a 3-D view of a DC power distribution plug-and-power strip (100) configured with: AC-DC power converter (not shown for simplicity) inside enclosure of the strip, which will convert the input AC power provided to the strip to specified DC powers; AC male input plug (3) on side #1, configured for power rating of the AC voltage being applied to (100), and providing AC input power to the strip (100), which is further configured to include power overcurrent protection device such as fuse residing inside the compartment labeled (4); AC power ON/OFF switch (2) on side #1, which controls input AC power to the strip; grounding wire (6) designated to connect to a designed Earth ground stud per agency regulations.

Figure 3:
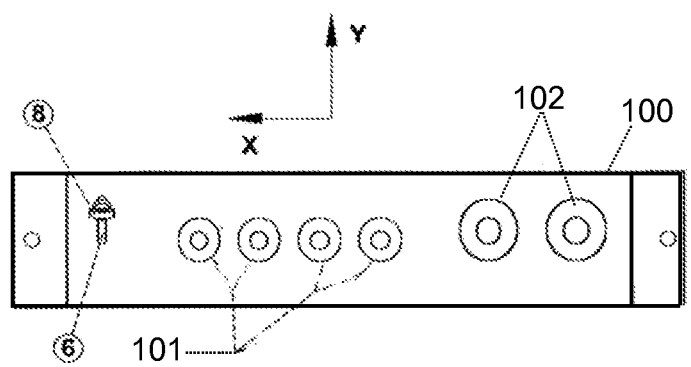

The invention in respect to FIG. 1 includes:
1) The input plug-and-power entry (3) and controls (2) are situated on side #1 of the strip (100), and the plug-and-power distribution of respective DC outlets situated on the side #2, opposite to side #1, as shown on FIG. 3.
2) The power distribution and power control interfaces are configured with pluggable connectors only.
3) The power distribution and power control interface is configured with input interface in a form of a male connector (3), and said male connector is further configured to comply to agency regulations, and the type of said male connector will depend on the power for conducting AC power, and said type of the said mail connector is further configured to identify the type of AC power conducted, and to identify power parameters AC Voltage and AC Current ratings conducted by said power distribution and power control interface (3).
4) The power female connectors are configured to accept the respective mating power male connectors, and are further configured when are connected—to prevent any power carrying component from being exposed outside the connection itself.

Figure 2:
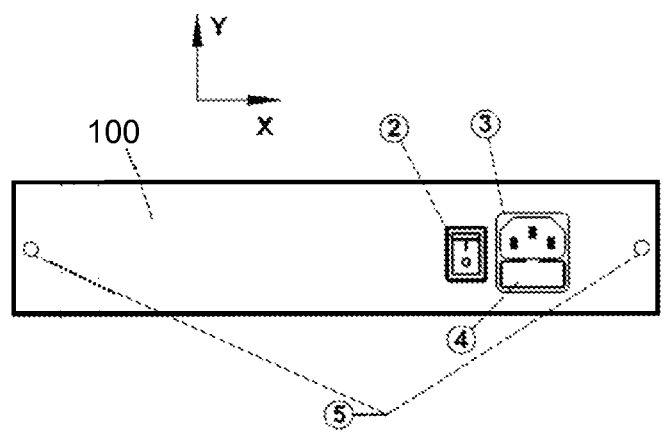

FIG. 2—illustrates view of side #1 of the DC power distribution plug-and-power strip (100) shown on FIG. 1. The enclosure of the strip (100), and its mounting holes (5) are configured to provide the following features of the invention:
a) All electrical AC power carrying components are enclosed to prevent access with bare hands to any high power leads, terminals, and to any other components carrying high power, which may present hazard.
b) The enclosure is configured for mounting at least one input interface (3) of said power distribution and control module (100), and for mounting at least one control component (2) of said power distribution and control module (100) on side one of said enclosure, and mounting at least one output interface (FIG. 3) of said power distribution and control module (100) on side two of said enclosure opposite to said side one.
c) Said enclosure is further configured for attaching said power distribution and control module (100) to a mounting surface;
d) Said mounting surface will have cut-out allowing access to said input interface (3) of said power distribution and control module (100);
e) Said mounting surface will have cut-out allowing access to said control component (2, 4) of said power distribution and control module (100);

FIG. 3—illustrates view of side #2 of the DC power distribution plug-and-power strip (100) shown on FIG. 1. The side #2 is configured to include: two DC plug-and-power female connectors (102) configured for providing DC voltage V1 and specified current rating; four DC plug-and-power female connectors (101) configured for providing DC voltage V2 and specified current rating; components (6, 8) are related for mounting the grounding wire described on FIG. 1. For the DC plug-and-power female connectors (101) the following standard connectors can be used, depending on DC power rating and gender:
a) DC jacks with ID of ~1.3 mm, which can be used for plug-and-power distribution of 5V;
b) DC jacks with ID of ~2 mm, which can be used for plug-and-power distribution of 12V;
c) DC jacks with ID of ~2.5 mm, which can be used for plug-and-power distribution of 24V;

The DC female connectors, such as DC jacks, are configured to accept the mating DC male connector, such as DC plugs, and both connectors are further configured when connected—to prevent any power carrying component from being exposed.

The invention in respect to FIG. 3 includes:
a) The power distribution and power control interface of (100) is further configured with an output interface (101, 102) in a form of a female connector, and
b) The said female connector is further configured to comply to agency regulations, and the type of said female connector (101, 102) will depend on the power for conducting DC power, and said type of the said female connector is further configured to identify the Voltage and Current ratings conducted by said power distribution and power control interface.
c) Said DC power distribution and control module further comprising; a DC power control distribution strip (100) for: industrial, commercial, and residential buildings, and said DC power distribution and control module further comprising; a DC power control distribution strip (100) for: machinery, and devices.

Figure 4:
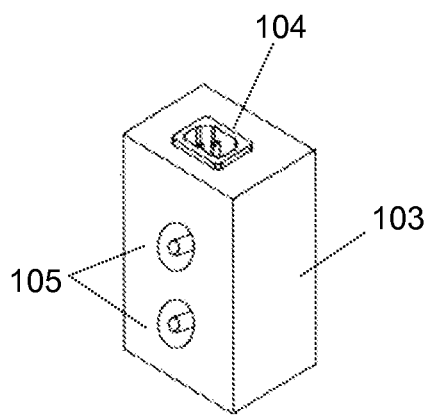

FIG. 4-illustrates a 3-D view of a DC controlled plug-and-power outlet (103) configured with: AC male connector (104), configured for power rating of the AC voltage being applied to (104), and providing AC input power for (103); AC-DC converter inside enclosure (not shown for simplicity), which is configured to convert the AC power applied to (103) to DC power of voltage V1 at specified current rating; two DC plug-and-power female connectors (105) providing DC voltage V1 at specified current rating. The AC-DC converter is further configured to: comply with agency regulations (safety, emissions, susceptibility); safety controls of the DC power applied to (105); regulations of the DC power applied to (105).

The plug-and-power outlet (103), as needed, can have AC feed-through female connector (not shown), which can be mounted on any side of the enclosure with the exception of the side with DC output connectors (105), which will allow to daisy-chain the outlet (103) with other modules of the plug-and-power distribution system, which use AC power for input. For the DC plug-and-power female connectors (105) the following standard connectors can be used, depending on DC power rating and gender:

a) DC jacks with ID of ~1.3 mm, which can be used for plug-and-power distribution of 5V;
b) DC jacks with ID of ~2 mm, which can be used for plug-and-power distribution of 12V;
c) DC jacks with ID of ~2.5 mm, which can be used for plug-and-power distribution of 24V;

The invention in respect to FIG. 4 includes:
a) DC power distribution module (103) configured as a wall or a pole mount power outlet;
b) Said outlet (103) is enclosed;
c) Said enclosure is configured for mounting at least one input interface (104) of said power distribution module (103) on side one of said enclosure, and mounting at least one output interface (105) on side two of said enclosure;
d) Said enclosure is further configured for attaching power distribution module to a mounting surface;
e) Said mounting surface will have cut-out allowing access to said output interface (105) of said side two of said power distribution module (103);
f) Said power distribution module (103) is further comprising; a wall or a pole mount power outlet for DC power distribution of: industrial, commercial, and residential buildings.

Figure 5:
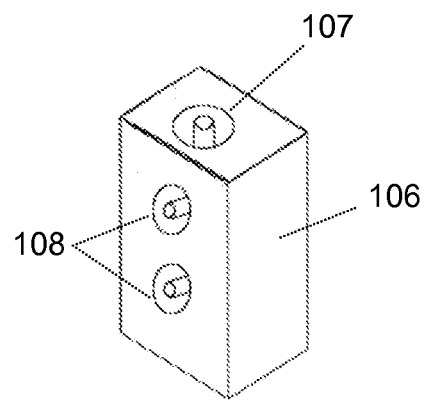

FIG. 5—illustrates a 3-D view of a DC plug-and-power outlet (106) configured with: DC male connector (107), configured for power rating of the DC voltage being applied to (106), and providing DC input power for (106); two DC plug-and-power female connectors (108) providing DC voltage V1 and specified current rating. The plug-and-power outlet (106), as needed, can have DC feed-through female connector (not shown), which can be mounted on any side of the enclosure with the exception of the side with DC output connectors (108), which will allow to daisy-chain the outlet (106) with other modules of the plug-and-power distribution system, which use DC power for input. For the DC plug-and-power male connector (107) and female connectors (108) the following standard connectors can be used, depending on DC power rating and gender:

a) DC plugs (male) and jacks (female) with ID of ~1.3 mm, which can be used for plug-and-power distribution of 5V;
b) DC plugs (male) and jacks with ID of ~2 mm, which can be used for plug-and-power distribution of 12V;
c) DC plugs (male) and (female) jacks with ID of ~2.5 mm, which can be used for plug-and-power distribution of 24V;

The invention in respect to FIG. 5 includes:
a) DC power distribution module (106) is configured as a wall or a pole mount power outlet;
b) Said outlet (106) is enclosed;
c) Said enclosure is configured for mounting at least one input interface (107) of said power distribution module (106) on side one of said enclosure, and mounting at least one output interface (108) on side two of said enclosure;
d) Said enclosure is further configured for attaching power distribution module to a mounting surface;
e) Said mounting surface will have cut-out allowing access to said output interface (108) of said side two of said power distribution module (106);
f) Said power distribution module (106) is further comprising; a wall or a pole mount power outlet for DC power distribution of: industrial, commercial, and residential buildings.

Figure 6:
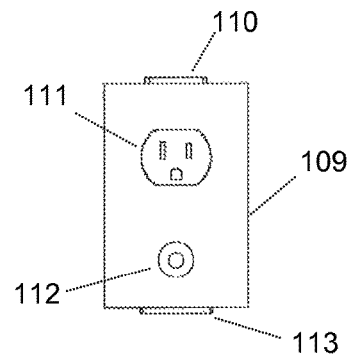

FIG. 6—illustrates front view of an AC/DC controlled plug-and-power outlet (109) configured with: AC male connector (110), configured for power rating of the AC voltage being applied to (109), and providing AC input power for (109); AC-DC converter inside enclosure (not shown for simplicity), which is configured to convert the AC power applied to (110) to DC power of voltage V1 at specified current rating; one AC plug-and-power female connector (111) providing AC voltage at specified current rating; one DC plug-and-power female connectors (112) providing DC voltage V1 at specified current rating. The AC-DC converter is further configured to: comply with agency regulations (safety, emissions, susceptibility); safety controls of the AC power applied to (111); regulations of the DC power applied to (112); AC feed-through female connector (113), which will allow to daisy-chain the outlet (109) with other modules of the plug-and-power distribution system, which use AC power for input.

The invention in respect to FIG. 6 includes:
a) AC/DC power distribution module (109) configured as a wall or a pole mount power outlet;
b) Said outlet (109) is enclosed;
c) Said enclosure is configured for mounting at least one input interface (110) of said power distribution module (109) on side one of said enclosure, and mounting at least one output interface (112) on side two of said enclosure, and mounting at least one output interface (113) on side three of said enclosure;
d) Said enclosure is further configured for attaching power distribution module (109) to a mounting surface;
e) Said mounting surface will have cut-out allowing access to said output interfaces (111, 112) of said side two of said power distribution module (109);
f) Said power distribution module (109) is further comprising; a wall or a pole mount power outlet for AC/DC power distribution of: industrial, commercial, and residential buildings.

Figure 7:
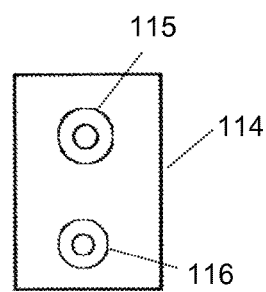

FIG. 7—illustrates front view of an DC plug-and-power outlet (114) configured with: first DC male connector (not shown for simplicity), configured for providing (109) with DC input power V1 at specified current rating; second DC male connector (not shown for simplicity), configured for providing (109) with DC input power V2 at specified current rating; one DC plug-and-power female connector (115) providing DC voltage V1 at specified current rating; one DC plug-and-power female connector (116) providing DC voltage V2 at specified current rating. The plug-and-power outlet (114), as needed, can have one DC feed-through female connector (not shown) with DC input power V1 at specified current rating, which can be mounted on any side of the enclosure with the exception of the side with DC output connectors (115, 116), which will allow to daisy-chain the outlet (114) with other modules of the plug-and-power distribution system, which use DC input power V1 at specified current rating for input. The plug-and-power outlet (114), as needed, can have one DC feed-through female connector (not shown) with DC input power V2 at specified current rating, which can be mounted on any side of the enclosure with the exception of the side with DC output connectors (115, 116), which will allow to daisy-chain the outlet (114) with other modules of the plug-and-power distribution system, which use DC input power V2 at specified current rating for input.

The invention in respect to FIG. 7 includes:
a) DC power distribution module (114) configured as a wall or a pole mount power outlet;
b) Said outlet (114) is enclosed;
c) Said enclosure is configured for mounting at least one DC input interface (not shown) of said power distribution module (114) on side one of said enclosure, and mounting at least one output interface (115, 116) on side two of said enclosure, and mounting additional output interface (not shown) on side three of said enclosure;
d) Said enclosure is further configured for attaching power distribution module (114) to a mounting surface;
e) Said mounting surface will have cut-out allowing access to said output interfaces (115, 116) of said side two of said power distribution module (114);
f) Said power distribution module (114) is further comprising; a wall or a pole mount power outlet for DC power distribution of: industrial, commercial, and residential buildings.

Figure 8:
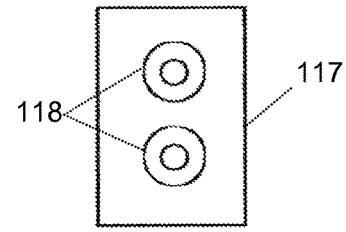

FIG. 8—illustrates front view of an DC plug-and-power outlet (117) configured with: DC male connector (not shown for simplicity), configured for providing (117) with DC input power V1 at specified current rating; two DC plug-and-power female connector (118) providing DC voltage V1 at specified current rating. The plug-and-power outlet (117), as needed, can have one DC feed-through female connector (not shown) with DC input power V1 at specified current rating, which can be mounted on any side of the enclosure with the exception of the side with DC output connectors (118), which will allow to daisy-chain the outlet (117) with other modules of the plug-and-power distribution system, which use DC input power V1 at specified current rating for input.

The invention in respect to FIG. 8 includes:
a) DC power distribution module (117) configured as a wall or a pole mount power outlet;
b) Said outlet (117) is enclosed;
c) Said enclosure is configured for mounting at least one DC input interface (not shown) of said power distribution module (117) on side one of said enclosure, and mounting at least one output interface (118) on side two of said enclosure, and mounting additional output interface (not shown) on side three of said enclosure;
d) Said enclosure is further configured for attaching power distribution module (117) to a mounting surface;
e) Said mounting surface will have cut-out allowing access to said output interfaces (118) of said side two of said power distribution module (117);
f) Said power distribution module (117) is further comprising; a wall or a pole mount power outlet for DC power distribution of: industrial, commercial, and residential buildings.

Figure 9:
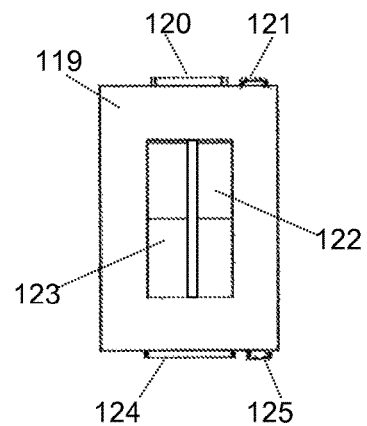

FIG. 9—illustrates front view of an AC/DC plug-and-power switch module (119) configured with: AC male connector (120), configured for power rating of the AC voltage being applied to (120), and providing AC input power for (119); DC male connector (121), configured for power rating of the DC voltage being applied to (121), and providing DC input power for (119); switch (123), configured to control ON/OFF the AC power from the input connector (120) to the AC output female connector (124); switch (122), configured to control ON/OFF the DC power from the DC input connector (121) to the DC output female connector (125). The AC/DC plug-and-power switch module (119) is further configured to: comply with agency regulations (safety, emissions, susceptibility).

The invention in respect to FIG. 9 includes:
a) Said switch (119) is enclosed;
b) Said enclosure is configured for mounting at least one input interface (120, 121) of said power distribution and control module (119) on side one of said enclosure, and mounting at least one output interface of said power distribution and control module on side one or side two of said enclosure (119);
c) Said enclosure is further configured for mounting said switch (122, 123) of said power distribution and control module on side three of said enclosure;
d) Said enclosure is further configured for attaching said power distribution and control module (119) to a mounting surface;
e) Said mounting surface will have cut-out allowing access to said switch (122, 123) of said power distribution and control module (119);
f) Said power distribution and control module (119) is further comprising; a wall or a pole mount power control switch (122, 123) for power distribution of: industrial, commercial, and residential buildings.

Figure 10:
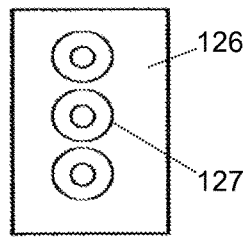

FIG. 10—illustrates front view of a DC plug-and-power outlet (126) similar to the one shown on FIG. 8, with the exception that three DC plug-and-power female connectors (127) providing DC voltage V1 at specified current rating.

Figure 11:
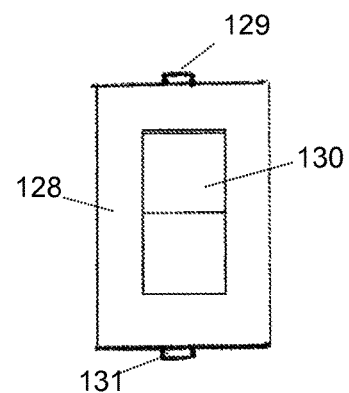

FIG. 11—illustrates front view of an DC plug-and-power switch module (128) configured with: DC male connector (129), configured for power rating of the DC voltage being applied to (129), and providing DC input power for (128); switch (130), configured to control ON/OFF the DC power from the input connector (129) to the DC output female connector (131).

The invention in respect to FIG. 11 includes:
a) Said switch (128) is enclosed;
b) Said enclosure is configured for mounting at least one input interface (129) of said power distribution and control module (128) on side one of said enclosure, and mounting at least one output interface of said power distribution and control module on side two of said enclosure (128);
c) Said enclosure is further configured for mounting said switch (130) of said power distribution and control module (128) on side three of said enclosure;
d) Said enclosure is further configured for attaching said power distribution and control module (128) to a mounting surface;
e) Said mounting surface will have cut-out allowing access to said switch (130) of said power distribution and control module (128);
f) Said power distribution and control module (128) is further comprising; a wall or a pole mount DC power control switch (130) for DC power distribution of: industrial, commercial, and residential buildings.

Figure 12:
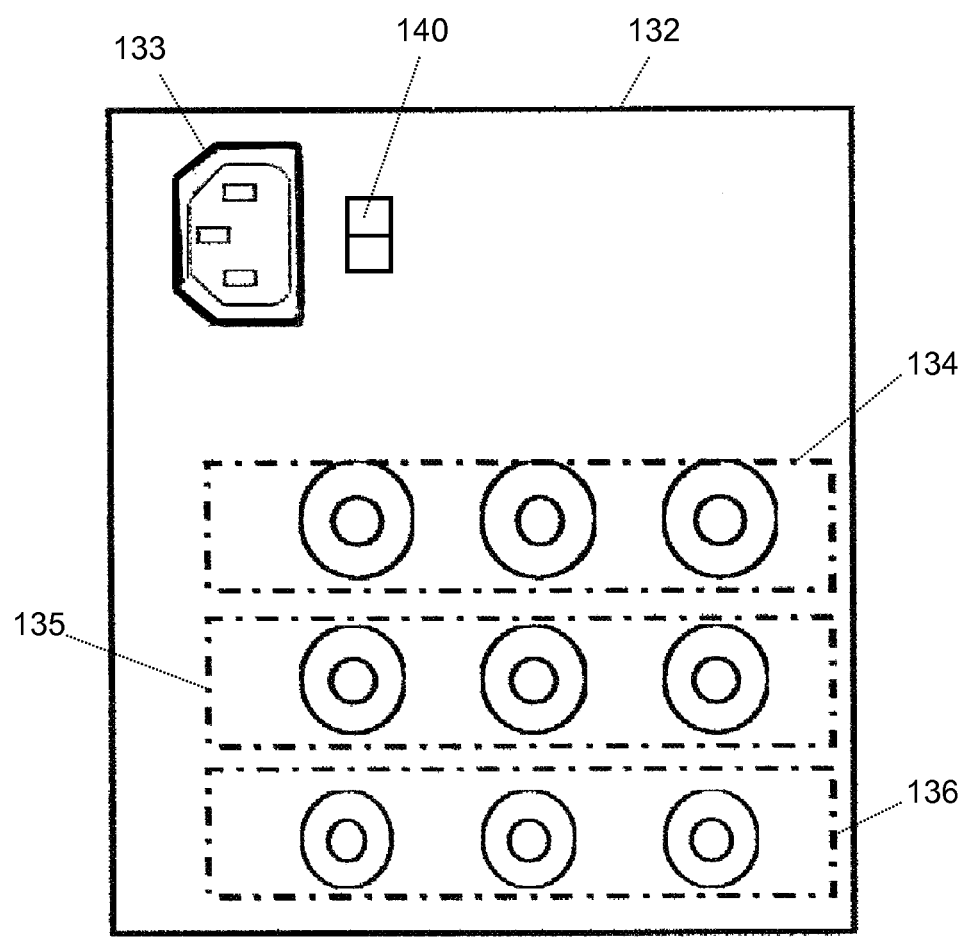

FIG. 12—illustrates conceptual layout of a AC-DC power converter (132) with only pluggable male interfaces for incoming AC power (133) and only pluggable female interfaces for outgoing DC powers, which is configured with: AC male connector (133) providing AC power; AC power ON/OFF switch (140), which controls AC power applied to (132); AC-DC converter (not shown for simplicity) inside (132), which is configured to convert the input AC power applied to (133) to DC power consisting of three separate DC voltages: V1, V2, V3 each at specified current rating, and the AC-DC converter (132) is further configured to comply with agency regulations (safety, emissions, susceptibility); section #1 (134) providing three plug-and-power DC female outlets for voltage V1 at specified current rating; section #2 (135) providing three plug-and-power DC female outlets for voltage V2 at specified current rating; section #3 (136) providing three plug-and-power DC female outlets for voltage V3 at specified current rating. For the DC plug-and-power female connectors (134, 135, 136) depending on DC power rating, the following standard connectors can be used:
   a) DC jacks with ID of ~1.3 mm, which can be used for plug-and-power distribution of 5V;
   b) DC jacks with ID of ~2 mm, which can be used for plug-and-power distribution of 12V;
   c) DC jacks with ID of ~2.5 mm, which can be used for plug-and-power distribution of 24V;

The invention in respect to FIG. 12 includes:
   a) Configurable power distribution and control module (132)
   b) Said power distribution and control module (132) configured for AC power input interfacing (133) with plug-and-power interface components (not shown for simplicity) of the invention, and through said interfaces receive power from other modules of the invention, or from outside AC power sources
   c) Said power distribution and control module (132) is further configured for controlling AC power applied to (133), including converting input AC power to DC power;
   d) Said power distribution and control module (132) is further configured for power output interfacing with (134,135,136), and through said output interfacing provide DC controlled power from said (132) to other modules of the invention, when said modules are plug-and-power connected to either of (134, 135, 136);
   e) Said power distribution and control module (132) is further configured for plug and power distribution and control without exposing power carrying components from being accessible with bare hands, and comprising:
     A) At least one power input interface (133) configured for mating with an output interface (not shown for simplicity) and providing input power from said interface to said (133);
     B) At least one power output interface (134, 135, 136) configured for mating with an input interface (not shown for simplicity) of said output interface (134, 135, 136) and providing output power from said (134, 135, 136) to said input interface;
     C) At least one power control component (140), (AC-DC converter of (132), not shown for simplicity) consisting of manual (140) and electronic controls (AC-DC converter), and said control component (140), (AC-DC converter of (132)) configured for controlling output power of at least one (134, 135, 136);
     D) At least one interface between (133), (140), AC-DC converter of (132), (134), (135), (136), and said interface consisting of at least one of a plurality of: discrete wires, cables, printed circuit boards, connectors;
     E) An enclosure configured for housing (A), (B), (C), (D);
     F) Said enclosure configured to prevent access with bare hands to any high power leads, terminals, and to any other components carrying high power, which may present hazard.
   f) Said DC power distribution and control module (132) further comprising DC power control distribution for: industrial, commercial, residential buildings, stand-alone devices, computers.

Figure 13:
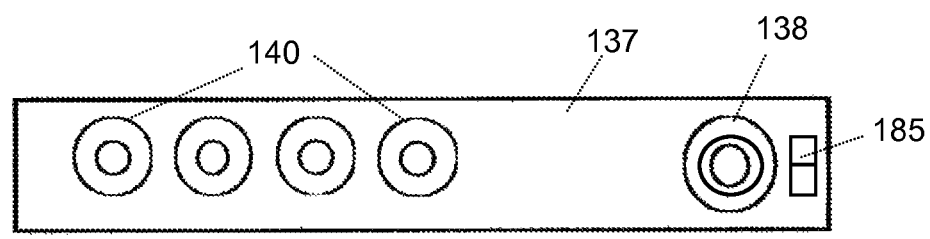

FIG. 13—illustrates a DC power distribution plug-and-power strip (137), which is configured to include: one DC plug-and-power input male connector (138), which is further configured to interface with plug-and-power interface (not shown for simplicity) and to provide DC input power voltage V1 at specified rating to (138); four DC plug-and-power output female connectors (140) configured for providing DC voltage V1 and specified current rating, and for plug-and-power interfacing with said plug-and-power interface providing DC power to other modules of the invention, or DC power for external loads, which are also interfaced with said plug-and-power interface. For the DC plug-and-power male connector (138) and female connectors (140), depending on DC power rating and gender, the following standard connectors can be used:
   a) DC plugs (male) and jacks (female) with ID of ~1.3 mm, which can be used for plug-and-power distribution of 5V;
   b) DC plugs (male) and jacks with ID of ~2 mm, which can be used for plug-and-power distribution of 12V;
   c) DC plugs (male) and (female) jacks with ID of ~2.5 mm, which can be used for plug-and-power distribution of 24V;

The invention in respect to FIG. 13 includes:
   a) The DC power distribution and power control interface of (138) is further configured with an output interface (140) in a form of a female connector, and
   b) The said female connector (140) is further configured to comply to agency regulations, and the type of said female connector (101, 102) will depend on the power for conducting DC power, and said type of the said female connector is further configured to identify the Voltage and Current ratings conducted by said power distribution and power control interface.

Figure 14:
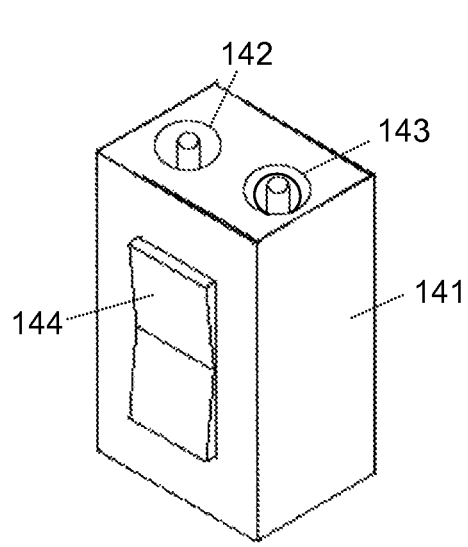
Figure 15:
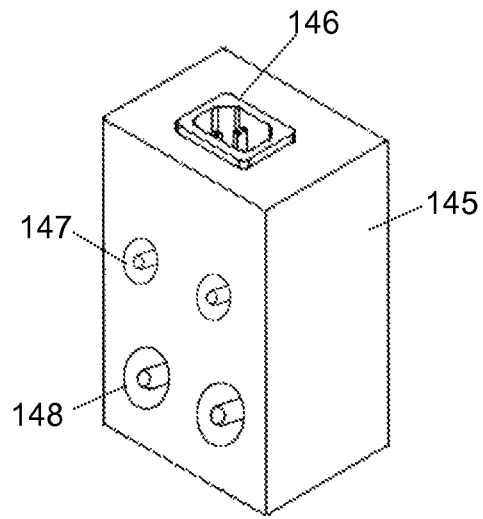
Figure 16:
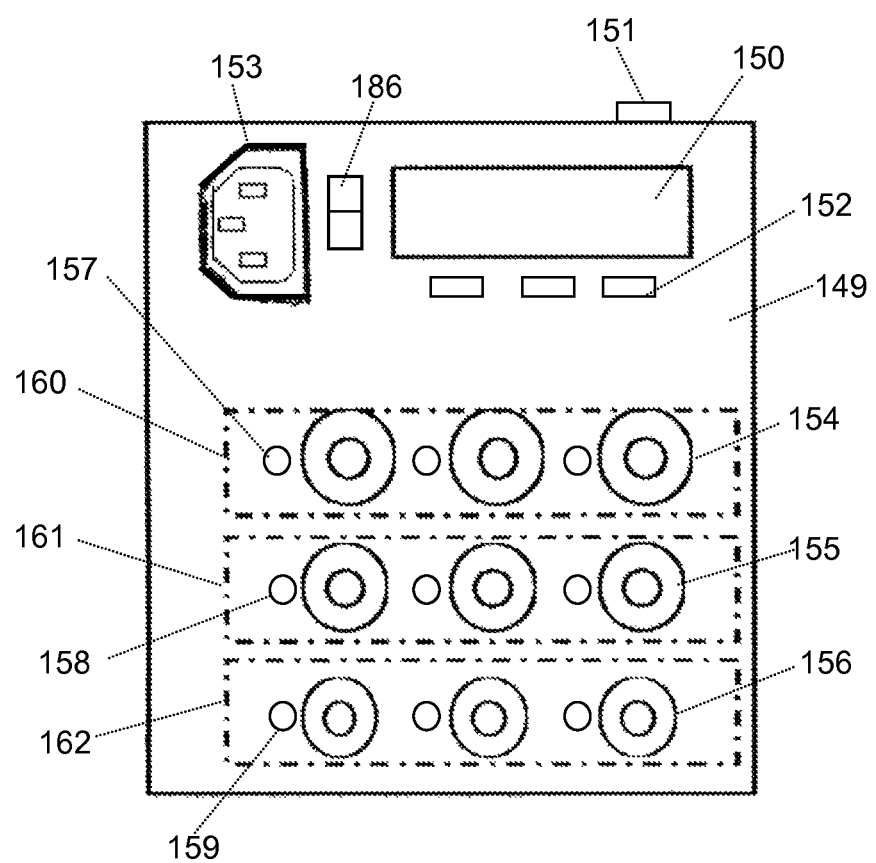

FIG. 14—illustrates 3-D view of an DC plug-and-power switch module (141) configured with: DC male connector (143), configured for power rating of the DC voltage being applied to (143), and providing DC input power for (141); switch (144), configured to control ON/OFF the DC power from the input connector (143) to the DC output female connector (142). For the DC plug-and-power male connector (143) and female connector (142), depending on DC power rating and gender, the following standard connectors can be used:
   a) DC plugs (male) and jacks (female) with ID of ~1.3 mm, which can be used for plug-and-power distribution of 5V;
   b) DC plugs (male) and jacks with ID of ~2 mm, which can be used for plug-and-power distribution of 12V;
   c) DC plugs (male) and (female) jacks with ID of ~2.5 mm, which can be used for plug-and-power distribution of 24V;

FIG. 15—illustrates a 3-D view of a DC controlled plug-and-power outlet (145) configured with: AC male connector (146), configured for power rating of the AC voltage being applied to (146), and providing AC input power for (145); AC-DC converter inside enclosure (not shown for simplicity), which is configured to convert the AC power applied to (146) to DC power of voltage V1 at specified current rating, and further to convert the AC power applied to (146) to DC power of voltage V2 at specified current rating; two DC plug-and-power female connectors (147) providing DC voltage V1 at specified current rating;

two DC plug-and-power female connectors (148) providing DC voltage V2 at specified current rating; The AC-DC converter is further configured to: comply with agency regulations (safety, emissions, susceptibility); safety controls of the DC power applied to (146); regulations of the DC power applied to (147, 148). For the DC plug-and-power female connectors (147, 148) the following standard connectors can be used, depending on DC power rating and gender:
  a) DC jacks with ID of ~1.3 mm, which can be used for plug-and-power distribution of 5V;
  b) DC jacks with ID of ~2 mm, which can be used for plug-and-power distribution of 12V;
  c) DC jacks with ID of ~2.5 mm, which can be used for plug-and-power distribution of 24V;

FIG. 16—illustrates conceptual layout of an intelligent plug and power distribution and control module configured as AC-DC power converter (149) consisting of: programmable controller (150); controller user interfaces (152); AC male connector (153) providing AC power; AC power ON/OFF switch (186), which controls AC power applied to (149); AC-DC converter (not shown for simplicity) inside (149), which is monitored and controlled by said programmable controller, and said AC-DC converter further configured to convert the input AC power applied to (153) to DC power consisting of three separate DC voltages: V1, V2, V3 each at specified current rating, and the AC-DC converter (149) is further configured to comply with agency regulations (safety, emissions, susceptibility); section #1 (134) providing three plug-and-power DC female outlets for voltage V1 at specified current rating; section #2 (135) providing three plug-and-power DC female outlets for voltage V2 at specified current rating; section #3 (136) providing three plug-and-power DC female outlets for voltage V3 at specified current rating; and self-diagnostics status LED's for each DC output (157, 158, 159) controlled by said programmable controller of (149); wired or wireless interface (151) to remote HOST computer. The self-diagnostics status LED's (157, 158,159) by either of states: ON or OFF, color change, flashing frequency, will indicate to the user the state of the respective DC output. Programmable controller (150) will:
  a) Interface with sensors of said (149) and monitor AC and DC power parameters of said (149)
  b) Interface with user controls (152), providing said user with ability to locally: configure the said (149), monitor (149), and make required adjustments to maintain DC power parameters of the selected DC power outputs (154, 155, 156) within preset specification parameters or criteria
  c) Interface with HOST computer (via 151), providing HOST computer with ability to: configure the said (149), monitor (149), and make required adjustments in real-time to maintain DC power parameters of the selected DC power outputs (154, 155, 156) within preset specification parameters or criteria.
  d) Interface with display components, such as LCD, LED's—to visually display the status of programmable controller, and components of said (149) and said DC outputs (154, 155, 156).

The AC-DC converter (149) can be further configured to provide DC plug and power distribution with communications, modulated over DC power line. In this configuration, the Programmable Controller (150) in addition to functions listed above, will be configured for:
  1) Modulating communication signals received from the Host, and transmitting the modulated communication signals over the DC power lines through plug and power connections of sections 160, 161, 162.
  2) Maintaining modulated communication signals to within set criteria
  3) Maintaining DC power outputs to within set criteria For the DC plug-and-power female connectors (154, 155, 156) depending on DC power rating, the following standard connectors can be used:
  a) DC jacks with ID of ~1.3 mm, which can be used for plug-and-power distribution of 5V;
  b) DC jacks with ID of ~2 mm, which can be used for plug-and-power distribution of 12V;
  c) DC jacks with ID of ~2.5 mm, which can be used for plug-and-power distribution of 24V;

The invention in respect to FIG. 16 includes:
  a) Programming, via an user interface (151, 152), said programmable controller (of said AC-DC converter 149) and said host computer (remote to 149) on said intelligent modular DC power control and DC power distribution system (which is 149 is part of);
  b) Receiving electrical signals to said programmable controller (of said AC-DC converter 149) from at least one of plurality of sensors (such as AC-DC converting components of 149);
  c) Controlling at least one power component (such as AC-DC converting components of 149) of a plurality of said modules (including said AC-DC converter 149) electronically such that at least one or more of the following DC power attributes, power voltage, power current, power energy (of said DC power outputs (154, 155, 156) of (149)) is controlled;
  d) Determining an optimized electrical configuration of at least one of a plurality of said modules (including (149)) by said programmable controller based at least in part on communications received (via interface (151)) from said host computer (remote to 149) and the signals received from said plurality of sensors and further including data for DC power voltage, power current, power energy;
  e) Sending electrical control signals from said programmable controller to said power component of a module (including (149)), based upon data from said user interface (152), said host computer (via interface (151)) and said sensors;
  f) Configuring and controlling said intelligent modular DC power control and power distribution system (which is (149) is a part of) of a building with programmable controllers, and said programmable controllers comprising programmable closed loop system maintaining DC power attributes (such as DC voltages on outputs (154, 155, 156)) of said system within programmable acceptance criteria, and the interface between power modules consisting of pluggable connectors (such as 154, 155, 156) only.

Figure 17:
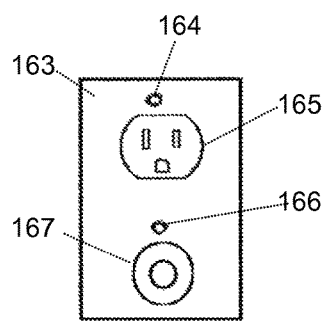

FIG. 17—illustrates front view of an intelligent AC/DC controlled plug-and-power outlet (163) configured with: AC male connector (not shown for simplicity), configured for power rating of the AC voltage being applied to (163), and providing AC input power for (163); programmable controller (not shown) installed inside (163); AC-DC converter inside enclosure (not shown for simplicity), which is configured to convert the AC power applied to (163) to DC power of voltage V1 at specified current rating; one AC plug-and-power female connector (165) providing AC voltage at specified current rating; one DC plug-and-power female connectors (167) providing DC voltage V1 at specified current rating; self-diagnostics status LED's, one LED (164) for indicating status of AC output (165), and the other LED (166) for indicating the status of DC output (167), and both LED's controlled by said programmable controller of (163). The intelligent AC-DC converter (163) is further configured to: comply with agency regulations (safety, emissions, susceptibility); safety controls of the AC power applied to (165); regulations of the DC power applied to (167). Optional AC feed-through female connector (not show for simplicity), which will allow to daisy-chain the input AC power with other modules of the plug-and-power distribution system, which use AC power for input.

Programmable controller of (160) will:
a) Interface with sensors of said (160) and monitor AC and DC power parameters of said (160)
b) Interface with HOST computer (via wireless interface, not shown for simplicity), providing HOST computer with ability to: configure the said (160), monitor (160), and make required adjustments in real-time to maintain DC power parameters of the selected DC power output (167) within preset specification parameters or criteria.
c) Interface with LED's—to visually display the status of said AC output (165) and said DC output (167).

Figure 18:
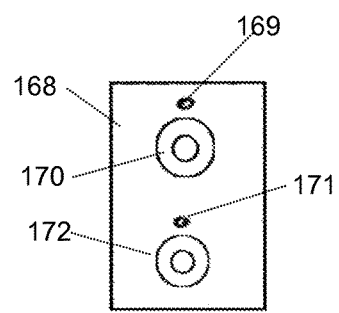

FIG. 18—illustrates front view of an intelligent DC plug-and-power outlet (168) configured with: first DC male connector (not shown for simplicity), configured for providing (168) with DC input power V1 at specified current rating; second DC male connector (not shown for simplicity), configured for providing (168) with DC input power V2 at specified current rating; one DC plug-and-power female connector (170) providing DC voltage V1 at specified current rating; one DC plug-and-power female connector (172) providing DC voltage V2 at specified current rating; self-diagnostics status LED's, one LED (169) for indicating status of DC output (170), and the other LED (171) for indicating the status of DC output (172), and both LED's controlled by said programmable controller of (168). The intelligent plug-and-power outlet (168), as needed, can have one DC feed-through female connector (not shown) with DC input power V1 at specified current rating, which can be mounted on any side of the enclosure with the exception of the side with DC output connectors (170, 172), which will allow to daisy-chain the DC outlet of (168) with other modules of the plug-and-power distribution system, which use DC input power V1 at specified current rating for input. The plug-and-power outlet (168), as needed, can have one DC feed-through female connector (not shown) with DC input power V2 at specified current rating, which can be mounted on any side of the enclosure with the exception of the side with DC output connectors (170, 172), which will allow to daisy-chain the outlet of (168) with other modules of the plug-and-power distribution system, which use DC input power V2 at specified current rating for input. Programmable controller of (168) will:
a) Interface with sensors of said (168) and monitor DC power parameters of said (168)
b) Interface with HOST computer (via wireless interface, not shown for simplicity), providing HOST computer with ability to: configure the said (168), monitor (168), and make required adjustments in real-time to maintain DC power parameters of the selected DC power outputs (170, 172) within preset specification parameters or criteria.
c) Controlling LED's—to visually display the status of said DC output (170) and said DC output (172).

The invention in respect to FIG. 18 includes:
a) DC power distribution module (168) configured as a wall or a pole mount power outlet;
b) Said outlet (168) is enclosed;
c) Said enclosure is configured for mounting at least one DC input interface (not shown) of said power distribution module (168) on side one of said enclosure, and mounting at least one output interface (170, 172) on side two of said enclosure, and mounting additional output interface (not shown) on side three of said enclosure;
d) Said enclosure is further configured for attaching power distribution module (168) to a mounting surface;
e) Said mounting surface will have cut-out allowing access to said output interfaces (170, 172) of said side two of said power distribution module (168);
f) Said power distribution module (168) is further comprising; a wall or a pole mount power outlet for DC power distribution of: industrial, commercial, and residential buildings.

Figure 19:
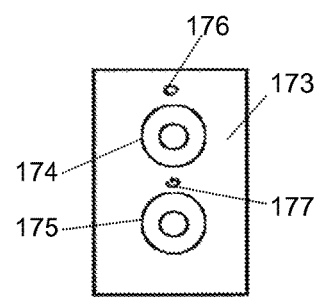

FIG. 19—illustrates front view of an intelligent DC plug-and-power outlet (173) configured with: DC male connector (not shown for simplicity), configured for providing (173) with DC input power V1 at specified current rating; programmable controller (not shown for simplicity) of (173); two DC plug-and-power female connectors (174, 175) providing DC voltage V1 at specified current rating; self-diagnostics status LED's, one LED (176) for indicating status of DC output (174), and the other LED (177) for indicating the status of DC output (175), and both LED's controlled by said programmable controller of (173). The intelligent plug-and-power outlet (173), as needed, can have one DC feed-through female connector (not shown) with DC input power V1 at specified current rating, which can be mounted on any side of the enclosure with the exception of the side with DC output connectors (174, 175), which will allow to daisy-chain the DC outlet of (173) with other modules of the plug-and-power distribution system, which use DC input power V1 at specified current rating for input. Said programmable controller of (173) will:
a) Interface with sensors of said (173) and monitor DC power parameters of said (173)
b) Interface with HOST computer (via wireless interface, not shown for simplicity), providing HOST computer with ability to: configure the said (173), monitor (173), and make required adjustments in real-time to maintain DC power parameters of the selected DC power outputs (174, 175) within preset specification parameters or criteria.
c) Controlling LED's, and via LED (176) visually display the status of said DC output (174), and via LED (177) visually display the status of said DC output (175).

Figure 20:
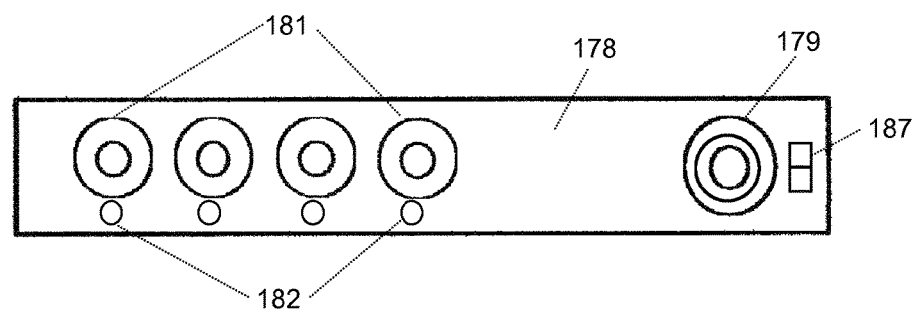

FIG. 20—illustrates an intelligent DC power distribution plug-and-power strip (178), which is configured to include: one DC plug-and-power input male connector (179), which is further configured to interface with plug-and-power interface (not shown for simplicity) and to provide DC input power voltage V1 at specified rating to (178); programmable controller (not shown for simplicity) of (178); four DC plug-and-power output female connectors (181) configured for providing DC voltage V1 and specified current rating, and for plug-and-power interfacing with said plug-and-power interface providing DC power to other modules of the invention, or DC power for external loads, which are also interfaced with said plug-and-power interface; four LED's (180) for indicating status of respective DC outputs (181), and all LED's controlled by said programmable controller of (178). Said programmable controller of (178) will:
a) Interface with sensors of said (178) and monitor DC power parameters of said (178)

b) Interface with HOST computer (via wireless interface, not shown for simplicity), providing HOST computer with ability to: configure the said (178), monitor (178), and make required adjustments in real-time to maintain DC power parameters of the selected DC power outputs (181) within preset specification parameters or criteria.

c) Controlling LED's (182) visually displaying the status of said respective DC outputs (181).

Figure 21:
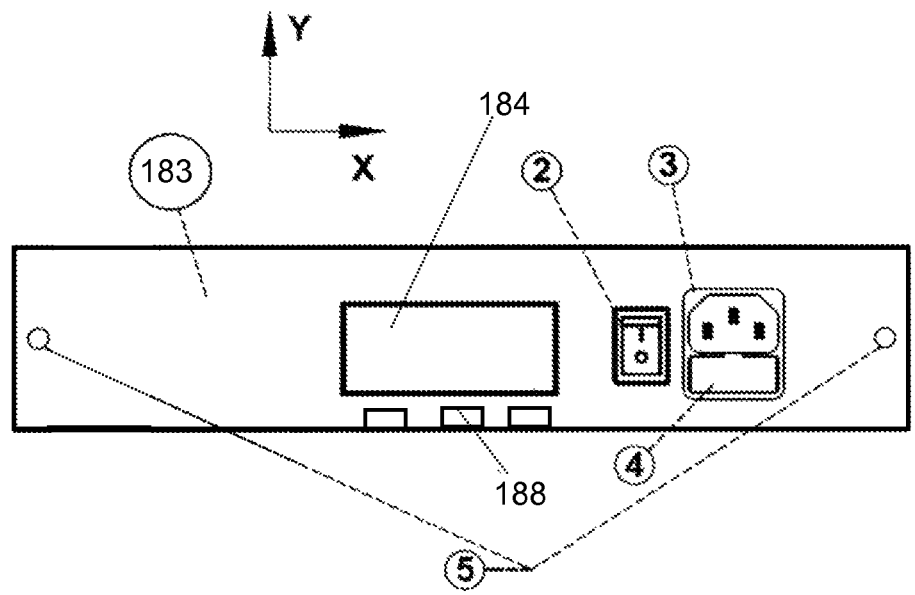

FIG. 21—illustrates view of side #1 of an intelligent DC power distribution plug-and-power strip (183), which is configured with the following components: programmable controller (184) of (183), with local user interface (188); AC-DC power converter (not shown for simplicity) inside enclosure of the strip (183), which will convert the input AC power provided to the strip via male AC interface connector (3) to specified DC powers, consisting of voltage V1 at specified current rating, and voltage V2 at specified current rating (connections are shown on FIG. 22); AC male input plug (3) on side #1, is configured for power rating of the AC voltage being applied to (183), and providing AC input power to the strip (183), which is further configured to include power over-current protection device such as fuse residing inside the compartment labeled (4); AC power ON/OFF switch (2) on side #1, which controls input AC power to the strip (183); and components mounted to side #2 of the enclosure of (183), which are shown on FIG. 22.

Figure 22:
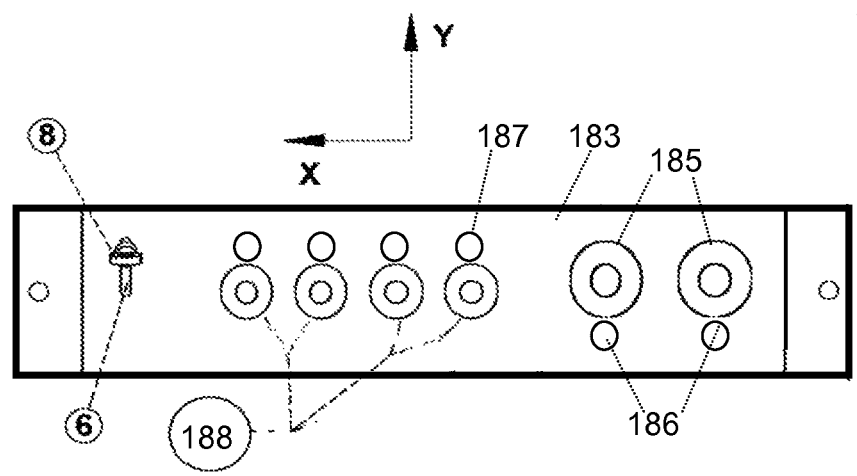

Said programmable controller (184) of (183) will:

a) Interface with sensors of said (183) and monitor AC and DC power parameters of said (183)

b) Interface with user controls (188), providing said user with ability to locally: configure the said (183), monitor (183), and make required adjustments to maintain DC power parameters of the selected DC power outputs (shown on FIG. 22) within preset specification parameters or criteria, stored in the non-volatile memory of the controller (184)

c) Interface with HOST computer (via wireless interface, not shown for simplicity), providing HOST computer with ability to: configure the said (183), monitor (183), and make required adjustments in real-time to maintain DC power parameters of the selected DC power outputs (shown on FIG. 22) within preset specification parameters or criteria, stored in the non-volatile memory of the controller (184).

c) Controlling LED's visually displaying the status of said respective DC outputs, as shown on FIG. 22.

The invention in respect to FIG. 21 includes:

a) All electrical AC power carrying components are enclosed to prevent access with bare hands to any high power leads, terminals, and to any other components carrying high power, which may present hazard.

b) Said enclosure is configured for mounting at least one input interface (3) of said power distribution and control module (183), and for mounting at least one control component (2) of said power distribution and control module (183) on side one of said enclosure, and mounting at least one output interface (FIG. 22) of said power distribution and control module (183) on side two of said enclosure opposite to said side one.

c) Said enclosure is further configured for attaching said power distribution and control module (183) to a mounting surface;

d) Said mounting surface will have cut-out allowing access to said controller (184) interfaces (184, 188) of said power distribution and control module (183);

e) Said mounting surface will have cut-out allowing access to said control components (2, 3, 4) of said power distribution and control module (183);

f) Said programmable control electronics (184) of (183) configured for interfacing (184) with an user interface, shown as local operator interface (188), or remote interface, and for monitoring and controlling output power of (183);

g) Plurality of sensors of (184) configured for monitoring the power attributes of said (183), and for monitoring ambient environment surrounding said (183), and for providing monitored data to said programmable control electronics (184) of (183);

h) Said user interface of (184) configured for programming said programmable control electronics of (183), and said user interface of connected to said programmable control electronics (184) of (183) via at least one of a network, wireless, wired cable connection or the INTERNET;

i) A non-volatile memory configured for interfacing with said programmable control electronics of (184), and storing trigger points for different sensor conditions, and storing acceptance criteria of said power attributes of (183), and storing control algorithm executed in real-time by said programmable control electronics (184) of (183) maintaining said power attributes of (183) within said acceptance criteria;

FIG. 22—illustrates view of side #2 of the DC power distribution plug-and-power strip (180) shown on FIG. 21. The side #2 is configured to include: two DC plug-and-power female connectors (185) configured for providing DC voltage V1 and specified current rating, with respective self-diagnostics LED's (186); four DC plug-and-power female connectors (188) configured for providing DC voltage V2 and specified current rating, with respective self-diagnostics LED's (187); components (6, 8) are related for mounting the grounding wire described on FIG. 21. For the DC plug-and-power female connectors (101) the following standard connectors can be used, depending on DC power rating and gender:

a) DC jacks with ID of ~1.3 mm, which can be used for plug-and-power distribution of 5V;

b) DC jacks with ID of ~2 mm, which can be used for plug-and-power distribution of 12V;

c) DC jacks with ID of ~2.5 mm, which can be used for plug-and-power distribution of 24V;

The invention in respect to FIG. 22 includes:

a) The power distribution and power control interface of (183) is further configured with an output interface (186, 188) in a form of a female connector, and b) The said female connector is further configured to comply to agency regulations, and the type of said female connector (186, 188) will depend on the power for conducting DC power, and said type of the said female connector is further configured to identify the Voltage and Current ratings conducted by said power distribution and power control interface.

c) Said DC power distribution and control module further comprising; a DC power control distribution strip (183) for: industrial, commercial, and residential buildings, and said DC power distribution and control module further comprising; a DC power control distribution strip (100) for: machinery, and devices.

Figure 23:
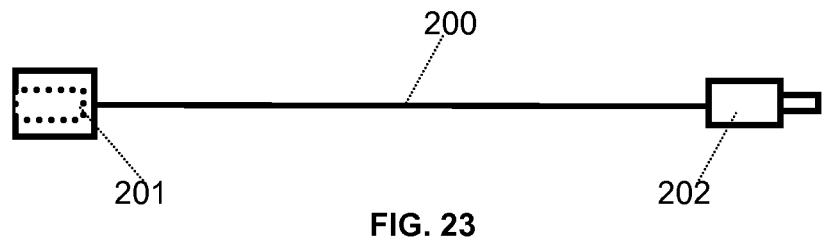

FIG. 23—illustrates an example of a DC plug and power distribution and control interface (200) configured on one end with a DC male plug and power connector (202) for interfacing to a DC power source, including configurable plug and power distribution and control module, and on the other end with a DC female plug and power connector (201) for interfacing to other plug and power modules within the apparatus, or to devices outside of the apparatus.

For the DC plug-and-power female connector (201) the following standard connectors can be used, depending on DC power rating and gender:
  a) DC jacks with ID of ~1.3 mm, which can be used for plug-and-power distribution of 5V;
  b) DC jacks with ID of ~2 mm, which can be used for plug-and-power distribution of 12V;
  c) DC jacks with ID of ~2.5 mm, which can be used for plug-and-power distribution of 24V;

For the DC plug-and-power male connector (202) the following standard connectors can be used, depending on DC power rating and gender:
  a) DC plug mating with DC jack ID of ~1.3 mm, which can be used for plug-and-power distribution of 5V;
  b) DC plug mating with DC jack ID of ~2 mm, which can be used for plug-and-power distribution of 12V;
  c) DC plug mating with DC jack OD of ~2.5 mm, which can be used for plug-and-power distribution of 24V;

The invention in respect to FIG. 23 includes:
  a) Said DC power distribution and power control interface (200) is configured with pluggable connectors (201, 202) only;
  b) Said DC power distribution and power control interface (200) is configured with input interface in a form of a male connector (202), and said male connector (202) is further configured to comply to agency regulations, and the type of said male connector (202) is further configured to identify the power parameters Voltage and Current ratings conducted by said DC power distribution and power control interface;
  c) Said DC power distribution and power control interface (200) is further configured with an output interface in a form of a female connector (201), and said female connector (201) is further configured to comply to agency regulations, and the type of said female connector (201) is further configured to identify the Voltage and Current ratings conducted by said DC power distribution and power control interface.

Figure 24:
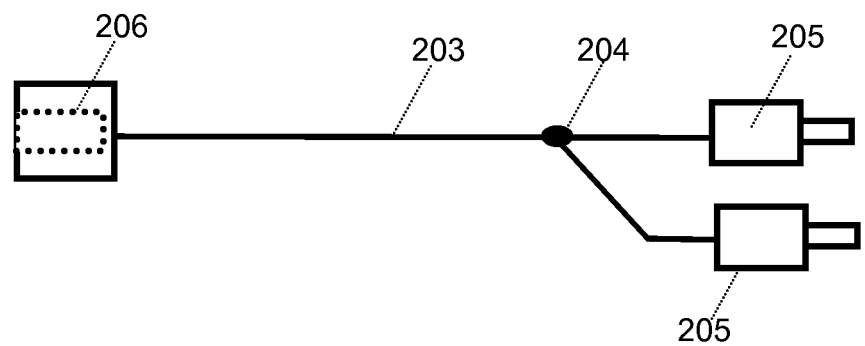

FIG. 24—illustrates an example of a DC plug and power distribution and control interface (203) configured on one end with a DC male plug and power connector (206) for interfacing to a DC power source, including configurable plug and power distribution and control module, and on the other end with two DC female plug and power connectors (205) for interfacing to other plug and power modules within the apparatus, or to devices outside of the apparatus. The split (204) of the interface (203) will interconnect the (206) with two (205).

Figure 25:
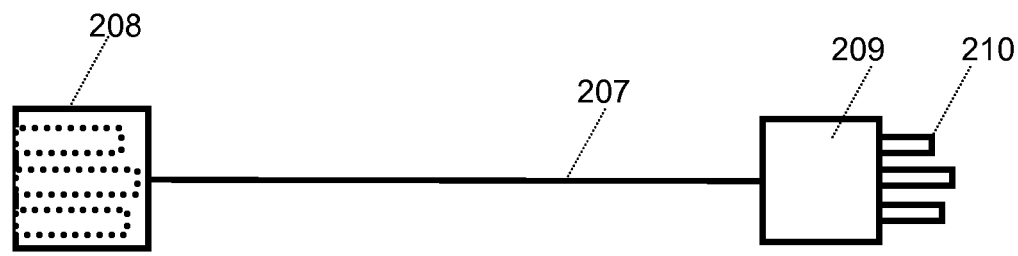

FIG. 25—illustrates an example of an AC plug and power distribution and control interface (207) configured on one end with an AC male plug and power connector (209) for interfacing to an AC power source, including configurable plug and power distribution and control module, and on the other end with an AC female plug and power connector (208) for interfacing to other plug and power modules within the apparatus, or to devices outside of the apparatus.

Figure 26:
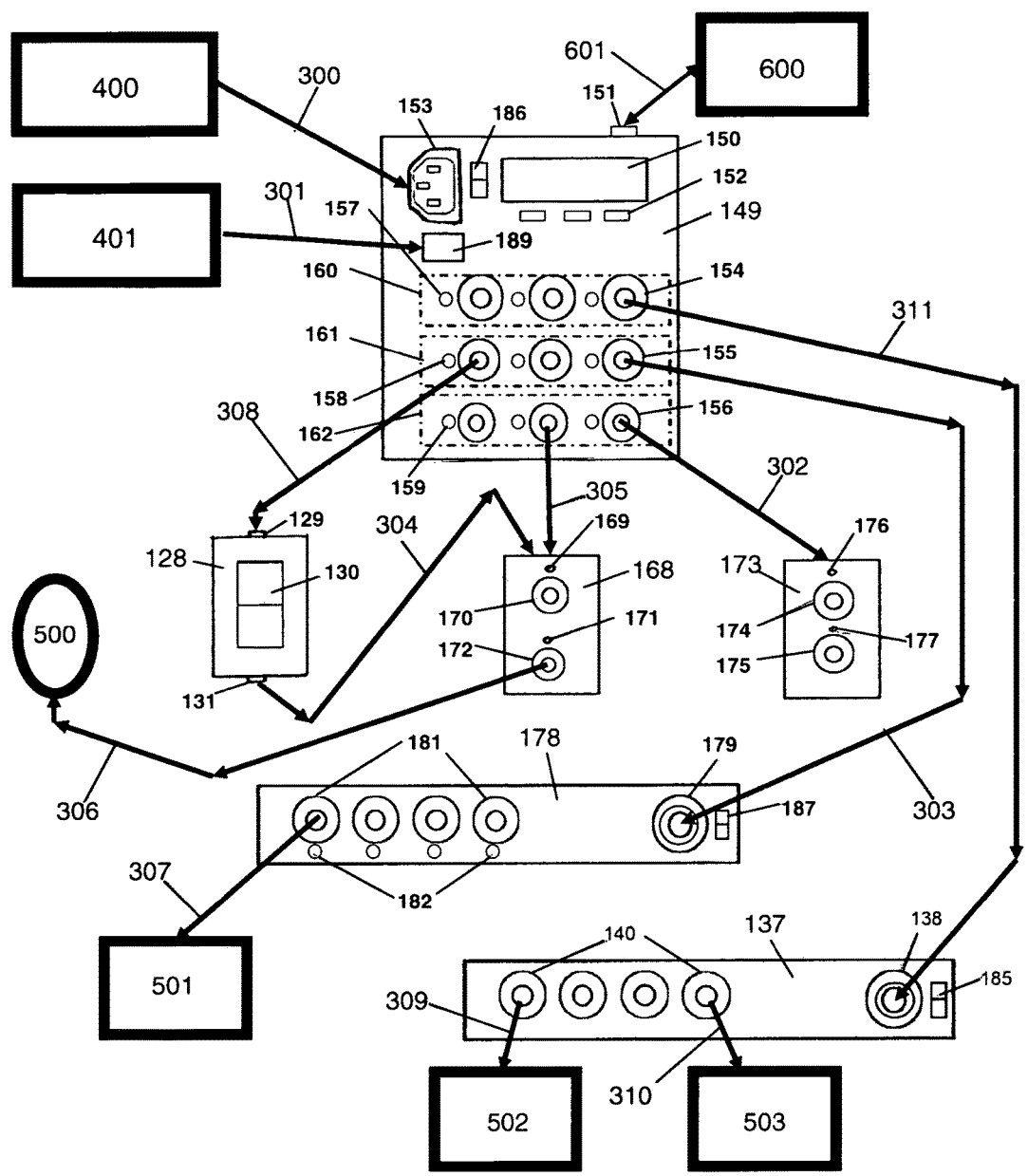

The invention in respect to FIG. 25 includes:
  a) Said AC power distribution and power control interface (207) is configured with pluggable connectors (208, 209) only;
  b) Said AC power distribution and power control interface (207) is configured with input interface in a form of a male connector (209), and said male connector (209) is further configured to comply to agency regulations, and the type of said male connector (209) is further configured to identify the power parameters Voltage and Current ratings conducted by said AC power distribution and power control interface;
  c) Said AC power distribution and power control interface (207) is further configured with an output interface in a form of a female connector (208), and said female connector (208) is further configured to comply to agency regulations, and the type of said female connector (208) is further configured to identify the Voltage and Current ratings conducted by said AC power distribution and power control interface.
  d) Said AC power distribution and power control interface (207) is enclosed, and said enclosure configured to house all components of (207), and when is connected—preventing exposing AC power carrying components of (207) from being accessible with bare hands;

FIG. 26—illustrates an example of a method of configuring and controlling an intelligent modular DC plug and power distribution and control apparatus (System) consisting of: configurable plug and power distribution and control interfaces (300 through 311); configurable plug and power distribution and control modules (149, 128, 178, 137); configurable plug and power distribution modules (168, 173, 137); external AC power source (400) connected via plug and power interface (300); external DC power source (401) connected via plug and power interface (301); remote host controller (600) connected via (601) representing at least one of a network, wireless, wired cable connection or the INTERNET. The DC loads powered by the system are labeled (500 through 503). The System can be used for DC plug and power distribution and control for a variety of applications, including: residential housings, apartment complexes, commercial structures, etc. All or some of the DC loads can be configured for plug and power connection to the System.

In respect to the FIG. 26, the following is illustrated:
  a) External AC power source (400) is connected via AC plug and power interface (300) to the AC plug and power connector (153) of the intelligent DC plug and power distribution and control module (149), and (400, 300) are configured to provide AC power to the AC-DC converter of the (149) under control of a local switch (186);
  b) External DC power source (401) is connected via DC plug and power interface (301) to DC plug and power connector (189) of the intelligent DC plug and power distribution and control module (149), and (401, 301) are configured to provide DC power to the (149), by-passing AC-DC converter of the (149);
  c) Depending on application requirements, any combination of external AC source (400) and/or DC source (401) can be used to power the entire (149), or sections of, and with AC and DC power distribution and controls of (149) complying to agency regulations.
  d) For illustration purposes, in the example on FIG. 26, the AC power source (400) will be used for AC-DC converter of (149), and under intelligent controls of the (149) the AC-DC converter will control DC voltage #1 (V1) at rated current, and the DC voltage #1 will be presented at the DC plug and power distribution section (160); and the AC-DC converter will control DC voltage #2 (V2) at rated current, and the DC voltage #2 will be presented at the DC plug and power distribution section (161).

e) For illustration purposes, in the example on FIG. 26, the DC power source (401) under intelligent controls of the (149) will be used directly control DC voltage #3 at rated current, and the DC voltage #3 (V3) will be presented at the DC plug and power distribution section (162).

f) The DC output plug and power sections (160, 161, 162) are configured with plug and power DC connectors representing the respective voltages at rated currents. The configuration of each connector (154, 155, 156) respectively of the DC plug and power sections (160, 161, 162) will ensure that plug and power interfaces of specific voltage (V1, V2, V3) will mate with respective connector outputting respective voltages V1, V2, V3. In the example: plug and power interface (311) can only be plugged into any connector (154) of section (160); plug and power interfaces (303, 308) can only be plugged into any connector (155) of section (161); plug and power interfaces (302, 305) can only be plugged into any connector (156) of section (162);

g) In the illustration, as described by (d, e, f)—the DC power source (401), such as a battery or stand-by generator, will be used as a stand-by DC power source, and can be designated to provide emergency stand-by DC power when AC power source (400) is not available.

h) DC plug and power distribution strip (137) is connected via (311) to (154) of (160), and is used for DC plug and power distribution of voltage V1 of section (160).

i) DC plug and power distribution strip (178) is connected via (303) to (155) of (161), and is used for DC plug and power distribution of voltage V2 of section (161).

j) DC plug and power control module (128), shown as a wall mount switch with plug and power input connector (129) and plug and power output connector (131), is connected to voltage V2 via (308, 129) to (155) of (161), and will control voltage V2 coming from (131) of (128).

k) The plug and power interface (304) is connected to (131) of (128), and will provide controlled power V2 to plug and power input #1 (not shown for simplicity) of the plug and power dual DC power outlet module (168).

l) DC plug and power interface (305) will connect voltage V3 from connector (156) of section (162) to plug and power connector #2 (not shown for simplicity) of the (168).

m) The (168), as shown, has plug and power outlet (172) with voltage V2 controlled by (128), which is connected via plug and power interface (306) to a DC powered light source (500), such as LED. The light source (500) is configured to operate under power V2, and as shown, the light will turn ON when the switch (128) is ON.

n) The plug and power interface (302) connects the V3 of (162) to plug and power input connector of dual plug and power DC outlet module (173), which has two plug and power outlets (174, 175) configured for providing V3 to respective loads connected.

o) DC load (501) is connected to plug and power strip (178), and will receive power V2 when switch (187) of the (178) is ON.

p) DC loads (502, 503) are connected to plug and power strip (137), and will receive power V1 when switch (185) of the (137) is ON.

Figure 33:
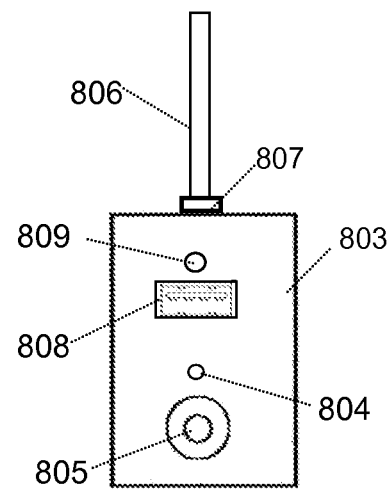

The AC-DC converter (149) can be further configured to provide DC plug and power distribution with communications, modulated over DC power line or DC power lines. In this configuration, the Programmable Controller (150) in addition to functions listed above, will be configured for:

1) Modulating communication signals received from the Host, and transmitting the modulated communication signals over the DC power lines through plug and power connections of sections 160, 161, 162.
2) Maintaining modulated communication signals to within set criteria
3) Maintaining DC power outputs to within set criteria When configured for DC plug and power distribution with communications, modulated over DC power lines, the AC-DC converter (149) can interface with DC plug and power distribution and communication modules such as the one (803) illustrated on FIG. 33, providing DC plug and power distribution, and communications to the module (803) through DC plug and power interface with modulated communication signals over the DC power lines, such as the one (806) shown on FIG. 33.

The System for providing DC plug and power distribution and controls, when configured for a DC safe range of powers, as defined by regulations, is intrinsically safe. In addition, throughout the entire System (as shown on FIG. 26, configured with an intelligent controller in this case), the DC power distribution and controls throughout the System are monitored by System controller, and compared in real-time to pre-configured levels of power (voltage, current, power), and any deviation from the set parameters is either corrected in real-time, or the respective power is shut down by the System controller. The System controller based on preset acceptance criteria stored in the controller non-volatile memory, or communicated in real-time by the Host controller, will execute in real-time controls over the plug and power distribution and control apparatus, with an objective to achieve the criteria. In addition, the System controller will monitor the ambient environment (temperature, vibrations, etc.) and execute pre-defined safety control algorithm in the event the ambient parameter is outside of the specified range. The control algorithm, the set criteria, and other configuration parameters can be stored in a non-volatile memory of the System controller, or communicated to the System controller by a remote Host controller in real-time, and then executed by the System controller directly, independent of an operator, or with assistance of the operator, as needed.

A typical plug and power DC power distribution and control System would provide: 5V, 12V, 24V, which are used for powering a variety of DC loads, such as: computers, small appliances, audio/video equipment, etc. The illustrated example of a plug and power DC power distribution and control System clearly underlines the advantages vs. existing AC power distribution methods.

Existing Methods.

In a typical household, there are number of DC powered loads, including: computers (desktop, laptop), electronic devices (phones, audio/video), etc. Each DC load requires an AC-DC converter: desktop computers with PSU built-in; laptop computers with DC power bricks; audio/video—combination of built-in PSU and stand-alone DC bricks.

As result, there are:

1) Energy wasted, since there are numerous AC-DC power converters with limited power conversion efficiency due to costs, size. Assuming an average efficiency of 90%, the power wasted would amount to 10% times number of converters operating at the same time.

In practical terms, just by touching the exterior of the enclosure of an AC-DC converter, the temperature above ambient—is clear indication of the wasted wattage.
2) Extra weight added to a "device" if PSU is built-in, or an additional accessory is required for devices with DC power brick.
3) Reliability of each device, in particular the ones with a built-in PSU (TV, etc.) is impacted negatively by the reliability of the PSU itself.

Method Described by the Invention.

The Plug and Power Distribution and Control Apparatus described by this invention will provide required number of high efficiency AC-DC power converters, which are located behind the walls (not visible by the user), as part of the intelligent DC power distribution and control System, which will:
   a) Maintain high-level of power conversion efficiency, and reliability
   b) Lower the weight, size and costs of electronic devices, which are no longer have a built-in AC-DC converters Example: In a typical household, there are number of DC powered loads, including: computers (desktop, laptop), electronic devices (phones, audio/video), etc. Each DC load requires an AC-DC converter: desktop computers with PSU built-in; laptop computers with DC power bricks; audio/video with either built-in PSU and/or stand-alone DC bricks. The built-in PSU or stand-alone PSU brick are one of the most critical components, and tend to fail primarily due to their inability to withstand noisy AC power that is feeding them. This impacts the RELIABILITY. In addition, there are power loses associated with each PSU, which is easily observed by the fact that the PSU is warm, or even hot. The heat—is a direct loss of energy, as result of inefficient AC-DC conversion. The described plug and power distribution and control apparatus will be configured with plug and power AC-DC converters, which will provide several DC outlets to be used for powering a number of DC power rated devices: computers (desktop, laptop), audio/video, etc. The apparatus plug and power AC-DC converters, replacing a number of stand-alone PSU, will be configured to provide high level of efficiency and reliability. For illustration purposes, the logic behind the benefits:
   1) Fewer AC-DC PSU converters, less parts being affected by noisy AC power, which are replaced with single high quality plug and power AC-DC converter configured to withstand noisy AC power, and achieve specified levels of RELIABILITY.
   2) Fewer AC-DC PSU converters replaced with single high quality plug and power AC-DC converter configured to achieve higher EFFICIENCY of AC-DC conversion, resulting in lowering the operating costs.
   3) Utilization of DC powered light sources (including LED's) directly powered from a plug and power outlet of the apparatus further improving energy efficiency associated with illumination.

In mathematical terms, including ever rising energy costs, it is clearly beneficial to replace the 10 individual PSU units operating simultaneously, each with efficiency of 80%, representing a total wasted power of (20%×10), with a more expensive plug and power AC-DC converter, and a second AC-DC converter as a back-up, each providing plug and power DC power distribution at an efficiency of 90%, reducing the wasted energy from (20%×10)−(10%× 1)=190%. This is a significant reduction. Other benefits from using plug and power distribution and control apparatus include:
   a) Lower complexity and weight of devices, which previously had built-in PSU
   b) Improved reliability of each device, since the plug and power AC-DC converter will distribute and control DC power of specified quality The invention in respect to FIG. 26 includes:
1) Configuring and controlling an intelligent modular DC power control and power distribution system
2) Configuring at least one of a plurality of modules consisting of DC power distribution components on said intelligent DC power control and DC power distribution system
3) Configuring said intelligent modular DC power control and DC power distribution system with a host computer
4) Configuring a power and control interfaces of said intelligent modular DC power control and DC power distribution system for providing connection between said system modules, and for providing connection between said modules and said host computer
5) Programming, via an user interface, said programmable controller and said host computer on said intelligent modular DC power control and DC power distribution system
6) Receiving electrical signals to said programmable controller from at least one of plurality of sensors
7) Controlling at least one power component of a plurality of said modules electronically such that at least one or more of the following DC power attributes, power voltage, power current, power energy is controlled
8) Determining an optimized electrical configuration of at least one of a plurality of said modules by said programmable controller based at least in part on communications received from said host computer and the signals received by said plurality of sensors and further including data for DC power voltage, power current, power energy
9) Sending electrical control signals from said programmable controller to said power component of a module, based upon data from said user interface, said host computer and said sensors.

FIG. 27—illustrates an existing powered 12V USB interface (700), which is used in applications where a computer, such as a desktop, is used to power a device with 12V (701) and communicate with a device via USB (702), using a single interface 12V power USB cable. The existing method presents limitations:
   a) USB communication speed through (702) may be affected due to close proximity to potentially noisy 12V power lines or PCB traces of (701)
   b) If connected on the computer mother-board, the distribution and controls of the 12V power which are in close proximity to other high-speed digital communications, may impact the quality of the 12V
   c) If connected on the computer mother-board, the presence of a relatively large 12V USB interface connector (700) will impact the overall packaging of the computer FIG. 28—illustrates replacement of the existing powered 12V USB interface (700) shown on FIG. 27 with a combination of a standard USB interface (703) and plug and power outlet (704), which can be configured to provide 12V as part of plug and power distribution and control apparatus. This configuration will:
   a) Allow to achieve higher communication speeds of the USB (703)
   b) Maintain clean 12V plug and power distribution independent of high-speed DSP taking place on the computer mother-board c) Optimize size of the computer by utilizing low profile interface connectors FIG. 29—illustrates replacement of the existing powered 12V USB interface (700) shown on FIG. 27 with a new connector (705), consisting of: plug and power 12V outlet (706), and an USB interface (707). The USB interface (707) can be controlled directly by the computer mother-board, or via USB hub connected to the mother-board. The plug and power 12V outlet (706) can be configured to be a part of a 12V plug and power distribution and control apparatus. The 12V outlet (706) can be configured independent of the computer mother-board. The 12V available through (706) can be configured to be controlled by the computer mother-board, or by controller of the plug and power distribution and control apparatus. The connector (705) can be grouped with other connectors of the same type and voltage (12V), mounted to a single PC-board, as shown on FIG. 30. The connector (705) can be grouped with other connectors of the same type and voltage (12V), and other connectors of the same type, but different size of connectors to indicate voltage other than 12V (example: 5V, 24V), and all connectors can be mounted to a single PC-board, providing plug and power distribution outlets, and USB interfaces on a single PC-board for convenience of interfacing with devices, which are DC powered and have an USB interface.

Figure 30:
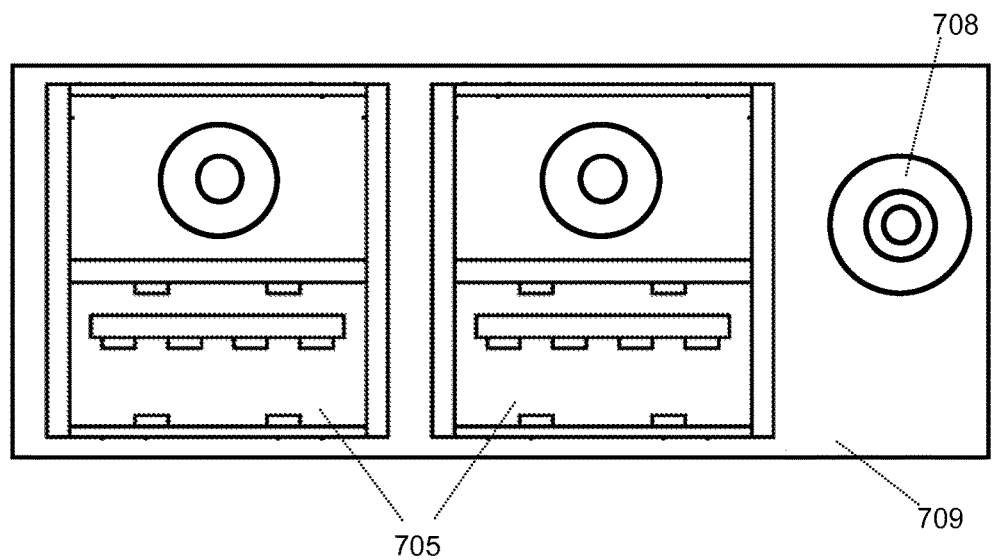

FIG. 30—illustrates PC-board (709) with two plug and power 12V outlets and an USB connectors (705), described for FIG. 29, and a 12V plug and power inlet connector (708). The (708) will be connected to 12V plug and power distribution interface of the apparatus, and provide 12V power to (705).

Figure 31:
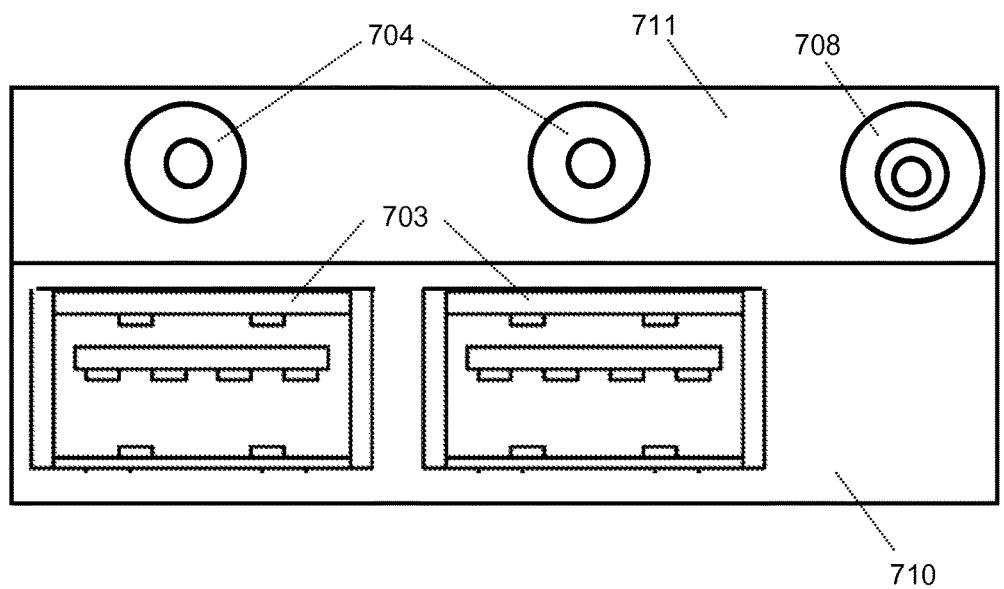

FIG. 31—illustrates PC-board (710) with two USB connectors (703), and PC-board (711) with two plug and power 12V outlets (704), described for FIG. 28, and a 12V plug and power inlet connector (708). The PC-boards (710) and (711) can be replaced with a single PC-board. The (708) will be connected to 12V plug and power distribution interface of the apparatus, and will provide 12V power to (704).

The illustrated plug and power connectors on FIG. 30 and FIG. 31 can be configured for plug and power distribution of DC power combined with plug and power distribution of communications, including: serial USB, Internet. The communication interfaces can share the same conductors as the ones carrying the DC power. The multiplexing by means of communication signal modulation, such as a frequency modulation, and then decoding or demodulation of the communication signals over the DC power distribution lines can be accomplished by the system controllers. The multiplexing of DC power and communications by means of modulation of the communication signals, will in modulation terms, such as frequency as an example, will separate the DC power from frequency modulated communication signals. For modulation based on frequency separation, the modulated frequency of the communication signals, will be selected to minimize potential cross-impact on DC power lines by communication signals, and wise-versa, minimize impact of communications signals on DC power. DC plug and power outlets can be configured with additional DC power regulation to further minimize the impact of modulated communication signals. Plug and power communication outlets can be configured with additional filters to further minimize the impact of DC power on modulated communication signals. The invention in respect to FIG. 31 includes: configuring and controlling said intelligent modular DC power control and power distribution system, including plug and power distribution combining plug and power communications.

Figure 32:
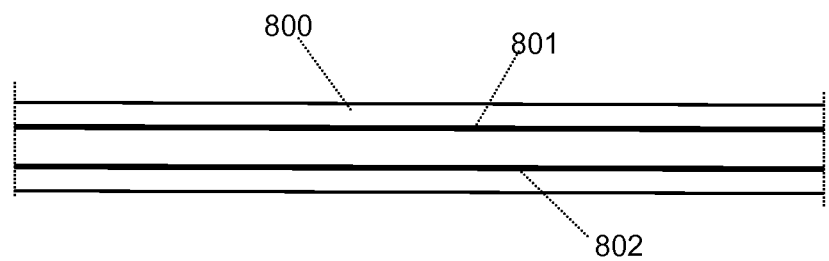

FIG. 32—illustrates a plug and power interface (800) of the apparatus which is configured to combine DC power distribution with communications, modulated over DC power line. The conductor (801) of the (800) is configured to conduct the DC power positive voltage, and the modulated communication signals. The conductor (802) of the (800) is configured as a DC power return. If conductor (802) is not connected to ground, then (802) can be configured to conduct DC power, and modulated communication signals.

FIG. 33—illustrates a plug and power outlet module (803) of the apparatus which is configured to provide one DC plug and power outlet (805) with diagnostics (804), and one plug and power communication outlet (808) with diagnostics (809). The plug and power interface (806) is configured with two conductors, one conductor carrying DC positive power and modulated communication signals, and the other conductor carrying DC return power, connected to ground. The plug and power interface of (806) will connect to plug and power interface (807) of (803). Controller of (803) (not shown for simplicity), will be configured with control algorithm and set criteria stored in its non-volatile memory, and the controller will be further configured for:

a) Isolating the DC power from modulated communication signals provided by (806) to set criteria b) Isolating modulated communication signals from DC power provided by (806) to set criteria c) Decoding the modulated communication signals received from (806) to within set criteria d) Regulating the DC power to within set criteria e) Providing un-modulated communication signals through the plug and power communication outlet (808), and indicating status by controlling (809)) status indicator, such as LED f) Providing regulated DC power through the plug and power outlet (805), and indicating status by controlling (804) status indicator, such as LED A controller of the Plug and Power Distribution and Control Apparatus will regulate the supply end of (808), opposite to the end feeding (803), including: regulating the DC power to within set criteria, and modulation of the communication signals over the DC positive power conductor of (806) to within set criteria.

The invention in respect to FIG. 33 includes: method of configuring and controlling the intelligent modular DC power control and power distribution system, including plug and power distribution combining with plug and power communications, and maintaining the DC power and the communications within respective set criteria.

What is claimed is:

1. A configurable DC plug and power control and distribution apparatus of electrical circuits interconnected by pluggable electrical cables for controlling and for distributing electrical DC power adaptable to ambient environment, and the apparatus is further adaptable to a specification of a device connected to the apparatus, and the apparatus executing a control algorithm within an acceptance criteria;

said configurable apparatus comprising of:

a configurable sensor for monitoring in real-time environmental parameters including: temperature, vibration, and humidity;

a configurable sensor for monitoring in real-time operating efficiency parameters including: power peak demand, overall power consumption, and power utilization efficiency;

a configurable sensor for monitoring in real-time DC power distribution parameters including: voltage and current;

a configurable DC power source regulating a DC power output;

a configurable controller;

a configurable communication interface between said controller of said apparatus and a remote controller including a host controller and/or an embedded controller of a device connected to said apparatus; said communication interface including wired, wireless and INTERNET;

a configurable electrical circuits of said apparatus interconnected by pluggable electrical cables interfacing components of said apparatus comprising a plug and power control and distribution of electrical DC power by said apparatus;

a configurable trigger points for each of said sensors;

a configurable safety acceptance criteria for said apparatus as function of said environmental parameters;

a configurable efficiency acceptance criteria for said apparatus as function of said efficiency parameters;

a configurable safety control algorithm for said controller for monitoring said environmental parameters and regulating said DC plug and power control and distribution of said apparatus within said safety acceptance criteria;

a configurable efficiency control algorithm for said controller for monitoring said efficiency parameters and regulating said DC plug and power control and distribution within said efficiency acceptance criteria;

a specification of a device connected to said apparatus; said device including an intelligent device configuration with an embedded controller; said intelligent device communicating over said communication interface with said controller of said apparatus; said communicating including said specification;

a configurable device adaptability criteria for said apparatus as function of said device specification;

a configurable device control algorithm for said controller of said apparatus for regulating a DC plug and power output control and distribution to said device adaptability criteria;

a configurable apparatus control algorithm as a function of said safety control algorithm, said efficiency control algorithm and said device control algorithm for sustaining said apparatus within a prioritized order of said acceptance criteria;

a configurable closed-loop control system of said apparatus; said system monitoring status of said sensors and communicating over said communication interface with a remote host controller and/or an intelligent device connected to said apparatus; and said apparatus executing said apparatus control algorithm regulating said DC plug and power control and distribution sustaining operation of said apparatus within said prioritized order of said acceptance criteria;

wherein the configuration of said apparatus is performed by an operator and/or a remote host controller over said communication interface including real-time configuration;

wherein the prioritization of said acceptance criteria for said apparatus is performed by an operator and/or a remote host controller over said communication interface including real-time prioritization.

2. The apparatus of claim 1 configured for a DC plug and power control and distribution of a DC power, and the apparatus operating as a closed-loop control system adapting in real-time to ambient environment by executing in real-time the safety control algorithm defined by an operator and/or a remote controller, and in the event the ambient environment is outside of a specified range, the apparatus regulating the DC plug and power control and distribution sustaining operation the apparatus within the safety acceptance criteria defined by an operator and/or a remote controller.

3. The apparatus of claim 1 configured for a DC plug and power control and distribution of a DC power, and the apparatus operating as a closed-loop control system executing in real-time the efficiency control algorithm defined by an operator and/or a remote controller, and the apparatus regulating the DC plug and power control and distribution sustaining operation of the apparatus within the efficiency acceptance criteria defined by an operator and/or a remote controller.

4. The apparatus of claim 1 configured for a DC plug and power control and distribution of a DC power, and the apparatus operating as a closed-loop control system controlling in real-time the DC power to a device connected to the apparatus, and the controls are based on the device adaptability criteria defined by an operator and/or a remote controller.

5. A method is described of configuring in real-time a DC plug and power control and distribution apparatus and of configuring an acceptance criteria for the apparatus for regulating the DC power control and distribution per the acceptance criteria in the following priority order: (1) environmental safety criteria, (2) operating efficiency criteria, and (3) device adaptability criteria; and the method comprising of:

configuring a number of the sensors of the apparatus for monitoring in real-time the environmental parameters such as: temperature, vibration, and humidity;

configuring a number of the sensors of the apparatus for monitoring in real-time the apparatus operating efficiency parameters such as: power peak demand, overall power consumption, and power utilization efficiency;

configuring a number of the sensors of the apparatus for monitoring in real-time the DC power distribution parameters such as: voltage and current;

configuring the DC power source for regulating the DC power outputs;

configuring the communication interlace between the controller of the apparatus and a remote controller including a host controller and/or an embedded controller of a device connected to the apparatus, and the communication interface based on one or combination of: wired, wireless and INTERNET;

configuring the electrical circuits of said apparatus for interconnecting by pluggable electrical cables and for interfacing components of said apparatus comprising a plug and power control and distribution of electrical DC power by said apparatus;

configuring trigger points for the environmental parameters;

configuring trigger points for the efficiency parameters;

configuring the safety acceptance criteria for the apparatus as regulating the DC power outputs as function of the trigger points for the environmental parameters and the apparatus contributing to the environmental safety;

configuring the efficiency acceptance criteria for the apparatus as regulating the DC power outputs as function of the trigger points of the efficiency parameters and the apparatus contributing in improving the efficiency of power utilization and lowering operating costs;

configuring a prioritized order of the acceptance criteria;
configuring the safety control algorithm for operating the apparatus within the safety acceptance criteria;
configuring the efficiency control algorithm for operating the apparatus within the efficiency acceptance criteria;
configuring the device adaptability algorithm for operating the apparatus within the device adaptability criteria;
configuring the apparatus control algorithm as a function of the safety control algorithm, the efficiency control algorithm and the device control algorithm, and the apparatus control algorithm sustaining the apparatus within the prioritized order of the acceptance criteria;
configuring the apparatus as a real-time closed loop control system and the system controller automatically with or without operator assistance executing in real-time the apparatus control algorithm regulating the plug and power DC power control and distribution sustaining the operation of the apparatus within the prioritized order of the acceptance criteria.

6. The method of claim 5 of the DC plug and power control and distribution apparatus configured for monitoring status of ambient environment and the apparatus executing in real-time the safety control algorithm as function of the status and the safety acceptance criteria including assisting the first responders facing adverse environmental condition.

7. The method of claim 5 of the DC plug and power control and distribution apparatus configured for monitoring status of the safety and the efficiency parameters, and the apparatus executing in real-time the apparatus control algorithm as function of the status and sustaining operation of the apparatus within the prioritized order of the acceptance criteria: (1) the safety and (2) the efficiency.

8. The method of claim 5 of the DC plug and power control and distribution apparatus configured for monitoring status of: the safety parameters, the efficiency parameters and the device adaptability parameters, and the apparatus executing in real-time the apparatus control algorithm as function of the status and sustaining operation of the apparatus within the prioritized order of the acceptance criteria: (1) the safety, (2) the efficiency and (3) device adaptability.

9. The method of claim 5 of the DC plug and power control and distribution apparatus configured for a project specification, and the apparatus in compliance with the project specification: (A) delivered to the project site as a complete plug and power kit, (B) installed at significantly lower costs compared to existing methods, and (C) the apparatus operating within the prioritized order of the acceptance criteria: (1) improving safety by regulating the DC power distribution as function of ambient environment, including the apparatus assisting the first responders facing adverse environmental condition, and (2) improving power utilization efficiency for reducing operating costs by regulating the DC power distribution as function of power rate information provided by an utility company and the specification(s) of the device(s) connected to the apparatus.

10. The method of claim 5 of the DC plug and power control and distribution apparatus configured as a real-time closed loop control system and the system automatically with or without operator assistance executing in real-time the control algorithm regulating the DC power distribution for sustaining the operation of the apparatus within the prioritized order of the acceptance criteria.

11. The method of claim 5 of the DC plug and power control and distribution apparatus configured for a building or a structure, including residential, commercial and industrial.

12. The method of claim 5 of the DC plug and power control and distribution apparatus configured for a stand-alone billboards and illuminated signs, including: street signs and freeway signs.

* * * * *